(12) United States Patent
Chernaik et al.

(10) Patent No.: US 11,017,407 B2
(45) Date of Patent: May 25, 2021

(54) METHOD AND SYSTEM FOR INDICATING AND DOCUMENTING ASSOCIATIONS, DISCLOSURES AND INSTRUCTIONS USING VISUALLY IDENTIFIABLE DESCRIPTION

(71) Applicant: CMP.LY, Inc., New York, NY (US)

(72) Inventors: Thomas Ari Chernaik, New York, NY (US); Kristopher Wayne Smith, Brooklyn, NY (US); James Edward Graham, Brooklyn, NY (US)

(73) Assignee: CMP.LY, Inc., New York, NY (US)

( * ) Notice: Subject to any disclaimer, the term of this patent is extended or adjusted under 35 U.S.C. 154(b) by 0 days.

(21) Appl. No.: 16/549,344

(22) Filed: Aug. 23, 2019

(65) Prior Publication Data

US 2020/0151736 A1    May 14, 2020

Related U.S. Application Data

(63) Continuation of application No. 15/675,884, filed on Aug. 14, 2017, now Pat. No. 10,395,255, which is a continuation of application No. 14/041,710, filed on Sep. 30, 2013, now Pat. No. 9,734,504, which is a continuation of application No. 13/273,965, filed on Oct. 14, 2011, now Pat. No. 8,549,140.

(60) Provisional application No. 61/393,357, filed on Oct. 15, 2010.

(51) Int. Cl.
*G06Q 30/00* (2012.01)
*G06Q 10/10* (2012.01)
*G06Q 30/02* (2012.01)

(52) U.S. Cl.
CPC ........... *G06Q 30/018* (2013.01); *G06Q 10/10* (2013.01); *G06Q 30/00* (2013.01); *G06Q 30/0251* (2013.01)

(58) Field of Classification Search
None
See application file for complete search history.

(56) References Cited

U.S. PATENT DOCUMENTS

| | | | | |
|---|---|---|---|---|
| 2005/0228899 | A1* | 10/2005 | Wendkos | H04L 67/306 709/232 |
| 2006/0173985 | A1* | 8/2006 | Moore | G06F 19/325 709/223 |
| 2008/0120129 | A1* | 5/2008 | Seubert | G06Q 10/10 705/35 |

* cited by examiner

*Primary Examiner* — Davoud A Zand
(74) *Attorney, Agent, or Firm* — Ziegler IP Law Group, LLC

(57) ABSTRACT

Methods and system for a unique coding framework used to create, manage and track instructions for documentation and dissemination of instructions, indicate a particular association or activate a given process. In one example, the present disclosure relates to the online publishing of documentation to demonstrate relationships of parties and compliance with regulatory and other requirements. The present disclosure uses URL hyperlinks, badges, watermarks, icons and visual displays that are representative of a given function and that may be identified by reference of unique coding structure. The present disclosure relates to the publishing and display of relevant visual codes or images for viewing by members of the public, (human readable) as well as machines. The present disclosure enables the tracking and measurement of uses of coded representations in public or private channels. Structured hyperlink codes allow brief messages to be sent in shortened form to instruct or deliver messages or processes.

21 Claims, 24 Drawing Sheets

Fig 1 - Item Descriptions

1. Descriptive URL
2. Descriptive Coded Instruction
3. Visual Display Badge
4. Watermark
5. Embed Code
6. Short Instruction
7. SMS
8. Unique ID
9. Social Media Update
10. Server
11. Mobile
12. CPU
13. Tablet
14. Wireless Device
15. User
16. User Input
17. Ticker Symbol
20. Social Network
21. Cloud
22. Hyperlink
23. Redirect Link
24. Substitute Pixel
25. Short Message
26. Designated Page URL
27. Disclosure/Instruction Type
28. Display Disclosure
29. Parsing Engine
30. Analytics Engine
31. Verification Engine
32. Redirect Engine
33. Tracking Engine
34. Audit Trail
35. Search Engine
36. Syndication Engine
37. Reporting Engine
38. Monitoring Engine
39. Image Obfuscation Engine
40. Appending Engine
41. Policy Engine
42. Policy Parser
43. Policy Differentiator
44. Policy Renderer
50. RSS Feed
51. Alerts Engine
52. SMS Engine
53. Email Engine
54. Feed Reporting
55. Archive Reporting
56. Appropriate Image
57. Warning Image
58. Documentation Engine
60. Brand Name
61. Campaign Name
62. Notes
63. Policy
64. Invitation
65. User Name
66. Password
70. Content Delivery Engine
71. Content
100. User
101. User Administrator
102. User Login
103. Admin Login
104. System Administrator
105. Consumer
106. Disclosure Accept
107. Machine Reader
108. Human Reader
110. Image ID
111. User ID
112. Campaign ID
113. Image Server
114. Website Request
115. Served Image
116. Warning Image
117. Safety Warning Image
120. Payment Engine
121. Payment Confirmation
122. Appended Social Media Update
123. AV Device
124. Annotated Social Media Update
125. Hyperlink to Verification Page
126. Payment Engine
127. Policy Engine
128. Disclosure Validation
130. CMP.ly/0
131. CMP.ly/1
132. CMP.ly/2
133. CMP.ly/3
134. CMP.ly/4
135. CMP.ly/5
136. CMP.ly/6
137. Descriptive Visual Representation
138. Annotation Engine
139. Display Interstitial
141. Character 1
142. Character 2
143. Character 3
144. Character 4
145. Character 5
146. Character 6
147. Character 7
150. Comparison Engine
151. Descriptive Comparison
161. Preference 1
162. Preference 2
163. Preference 3
164. Preference 4
165. Preference 5
166. Preference 6
167. Preference 7

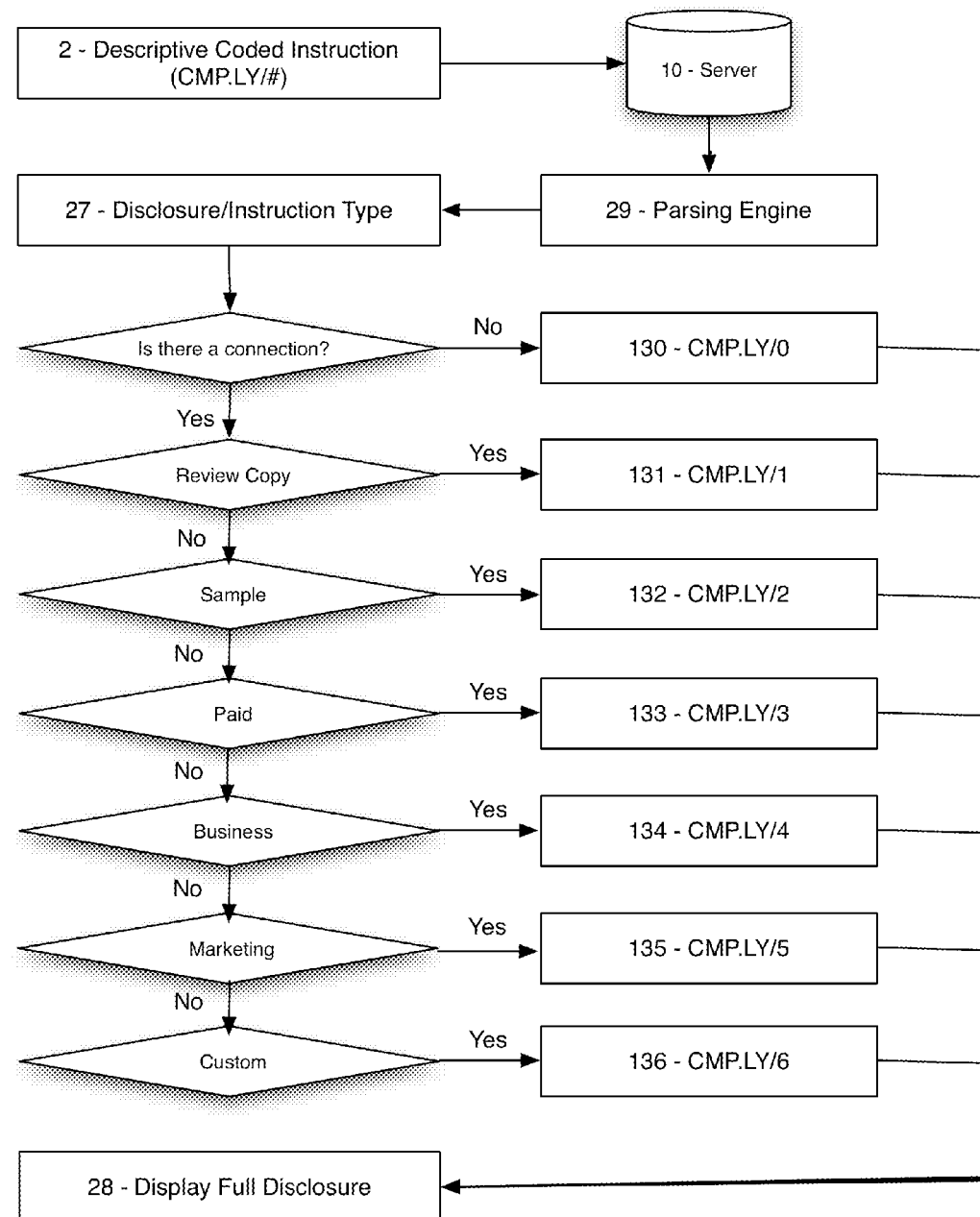

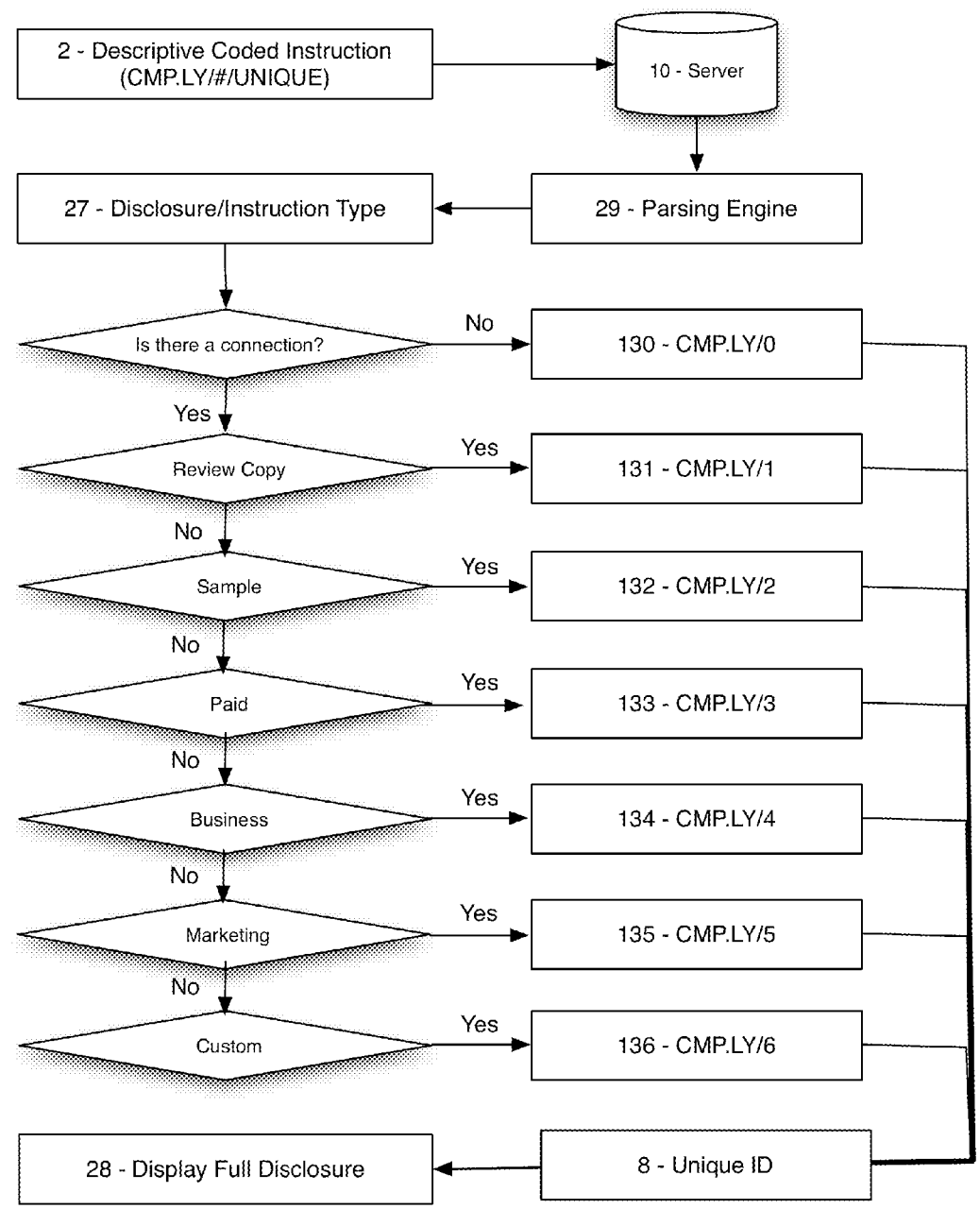

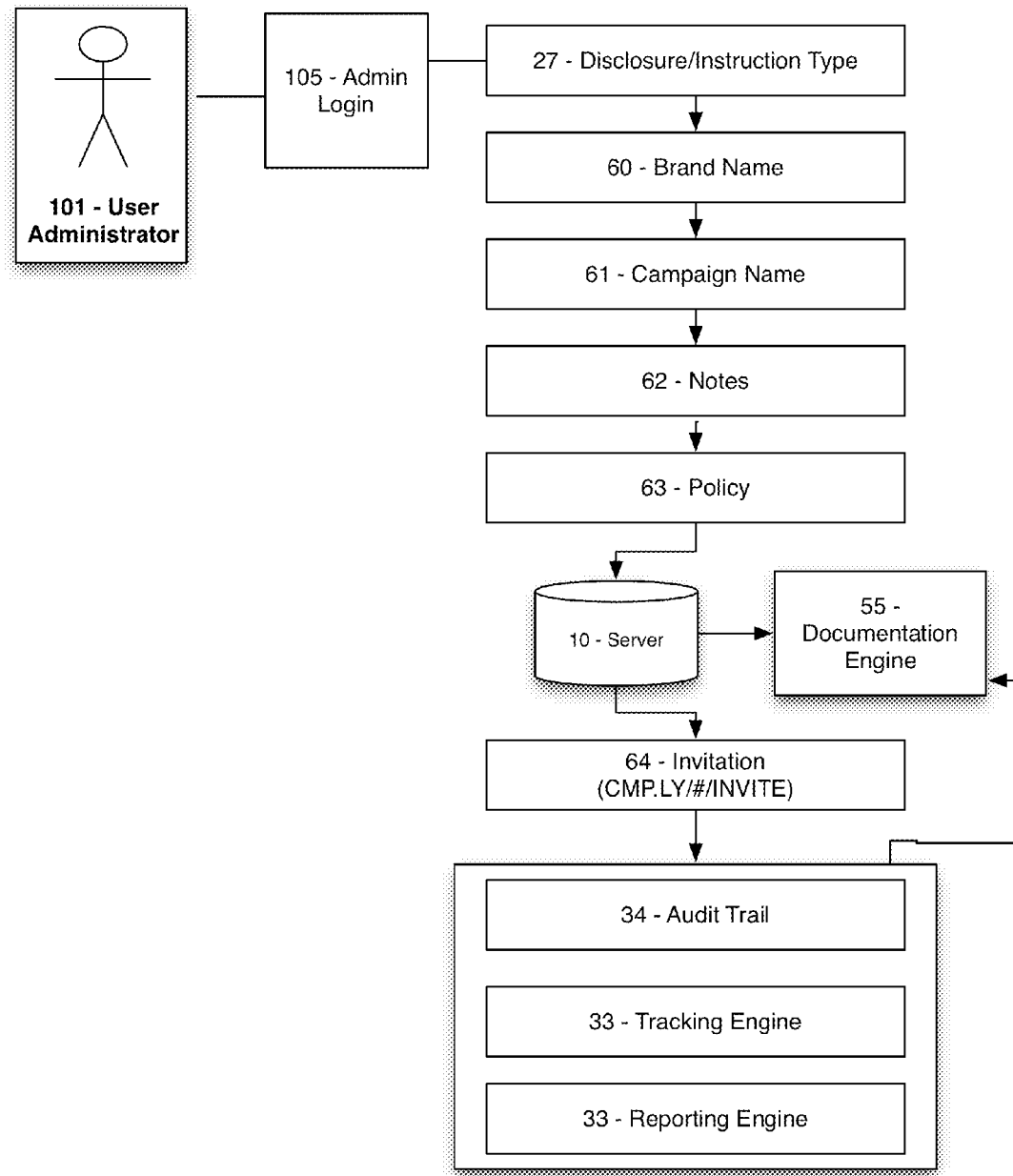

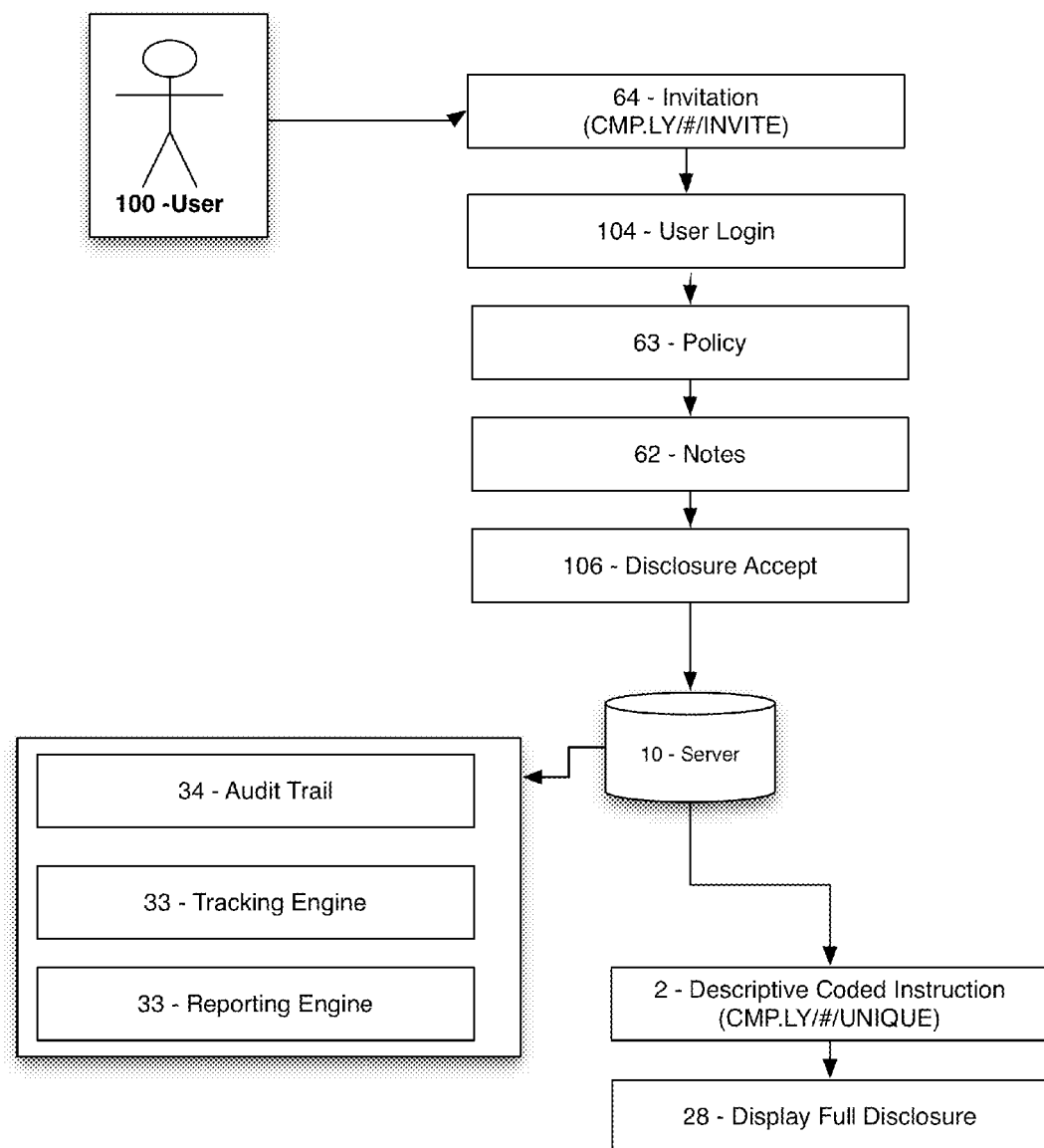

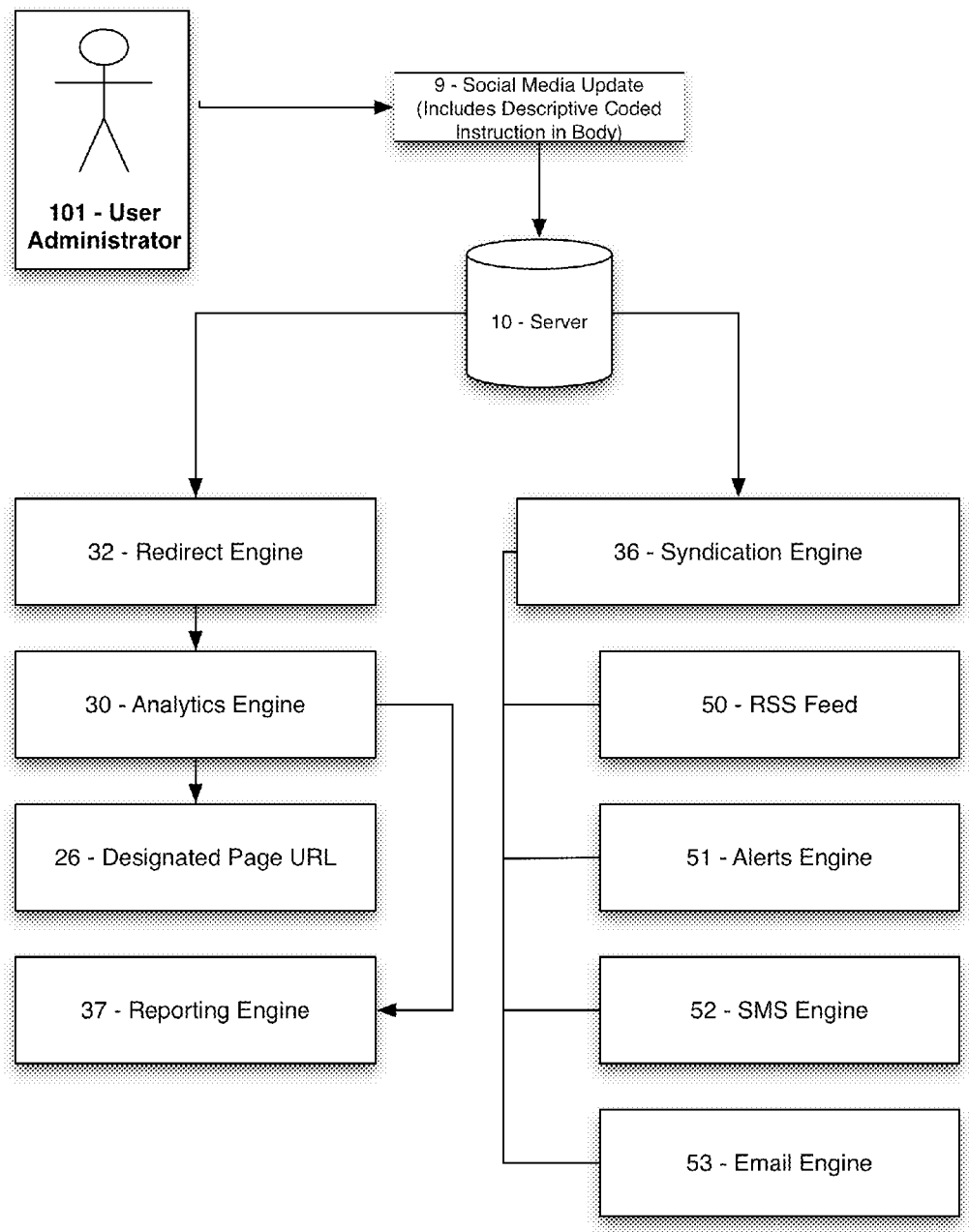

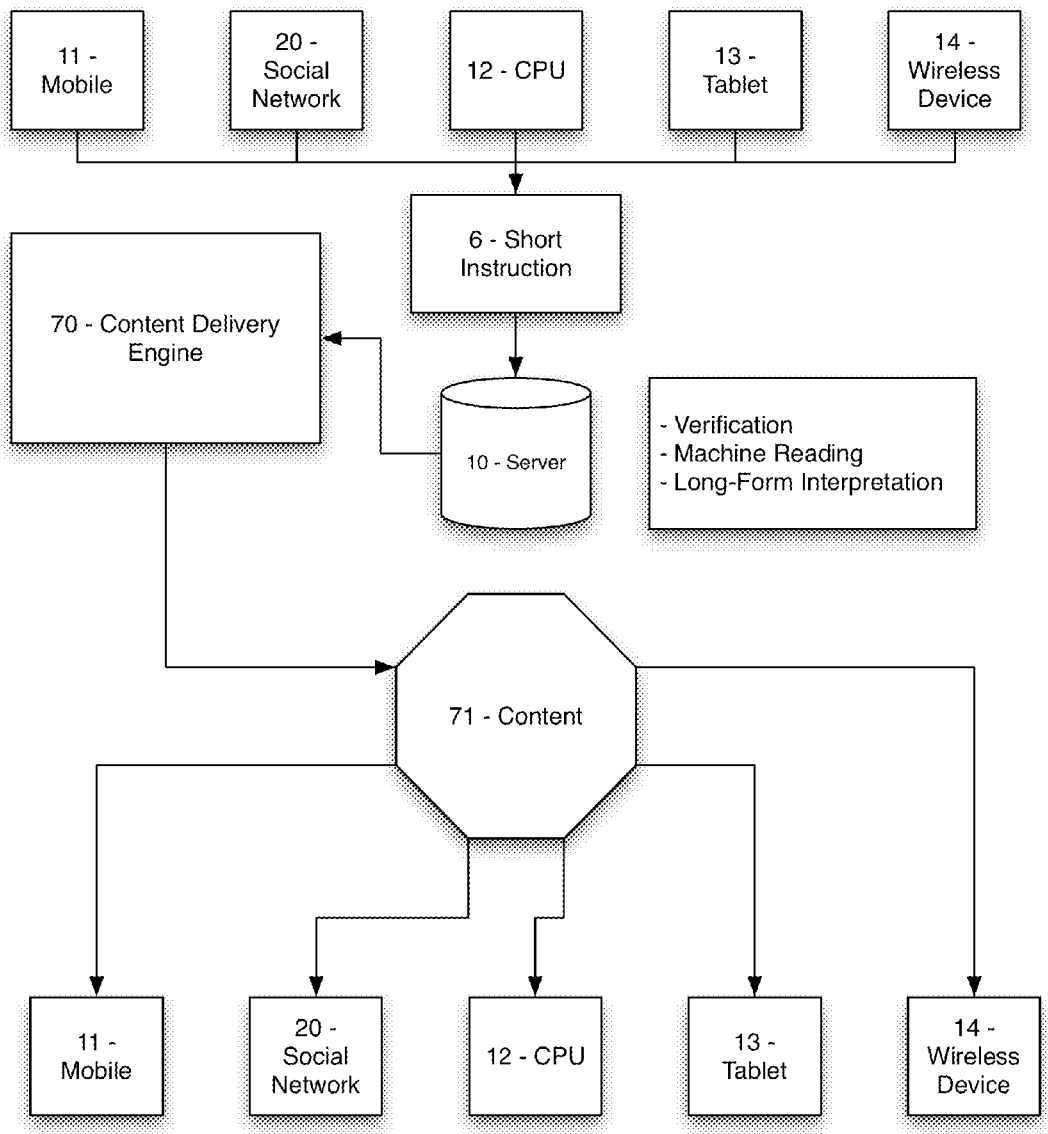

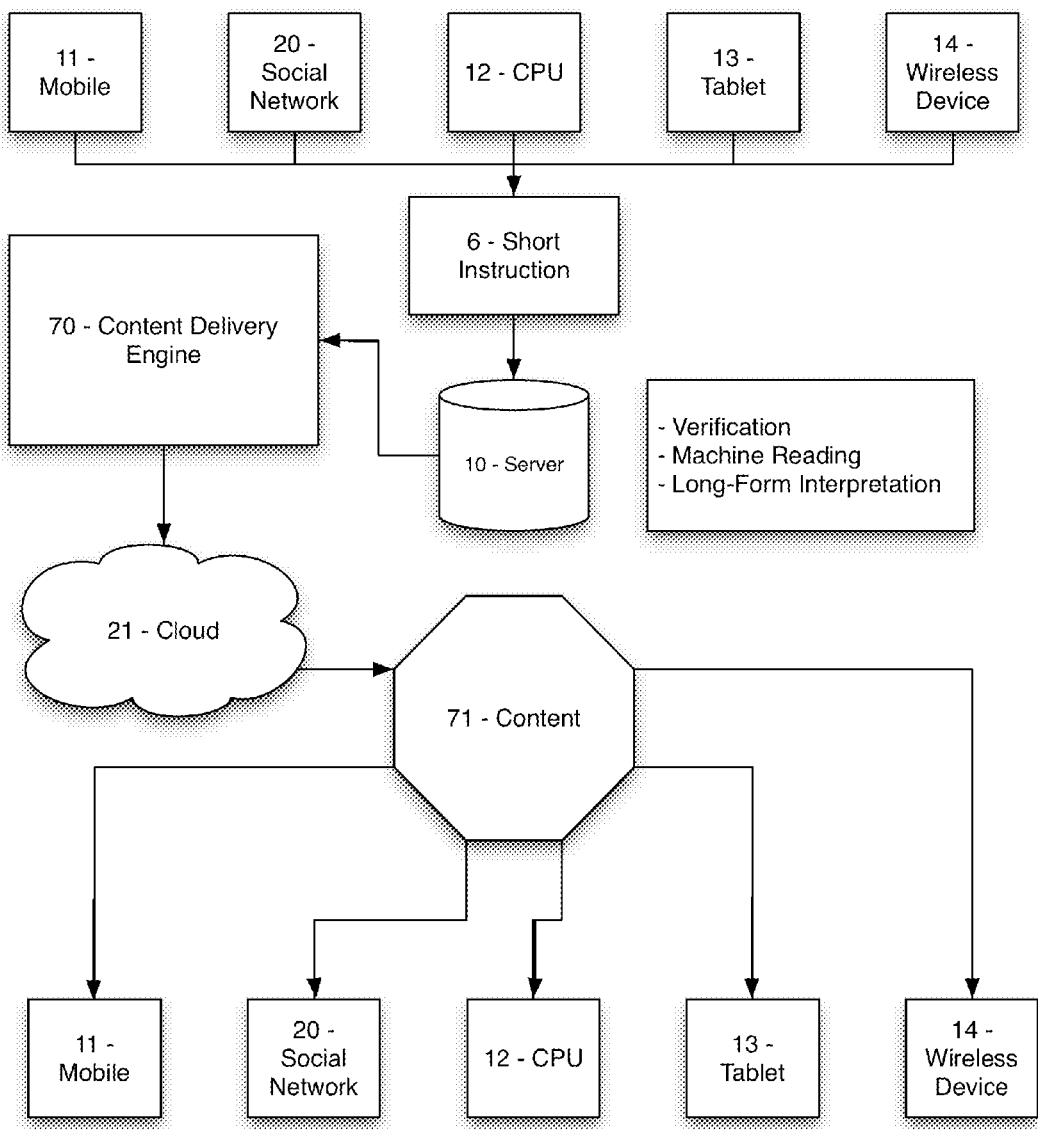

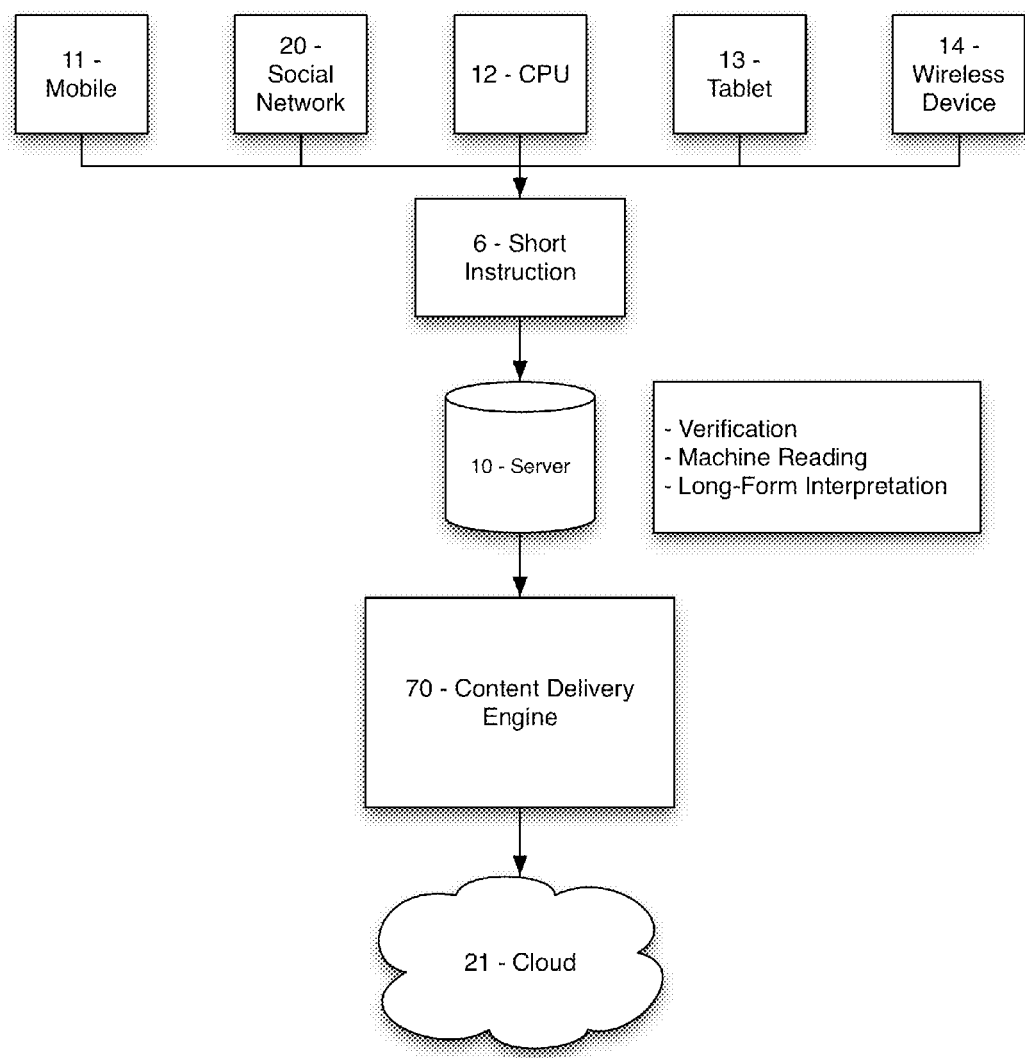

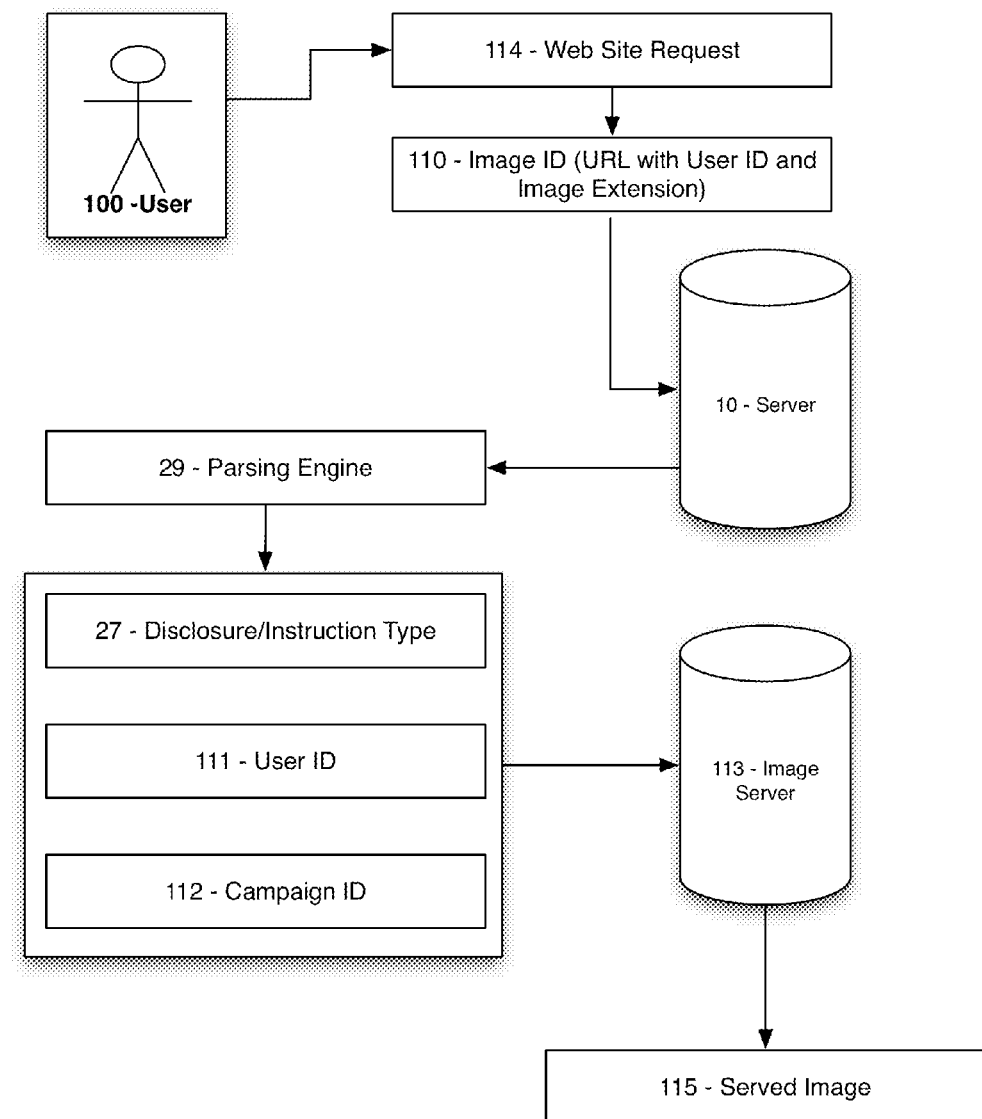

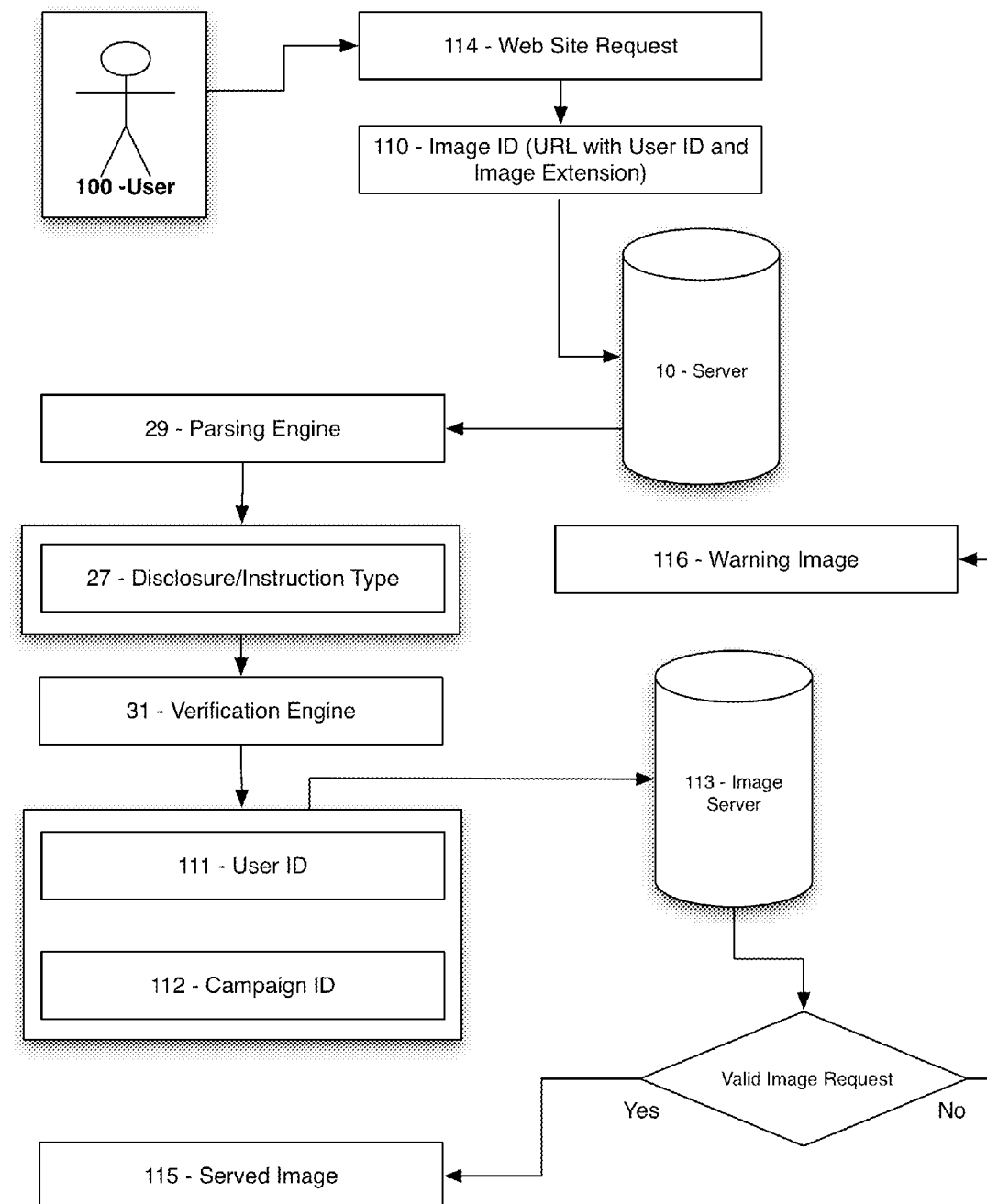

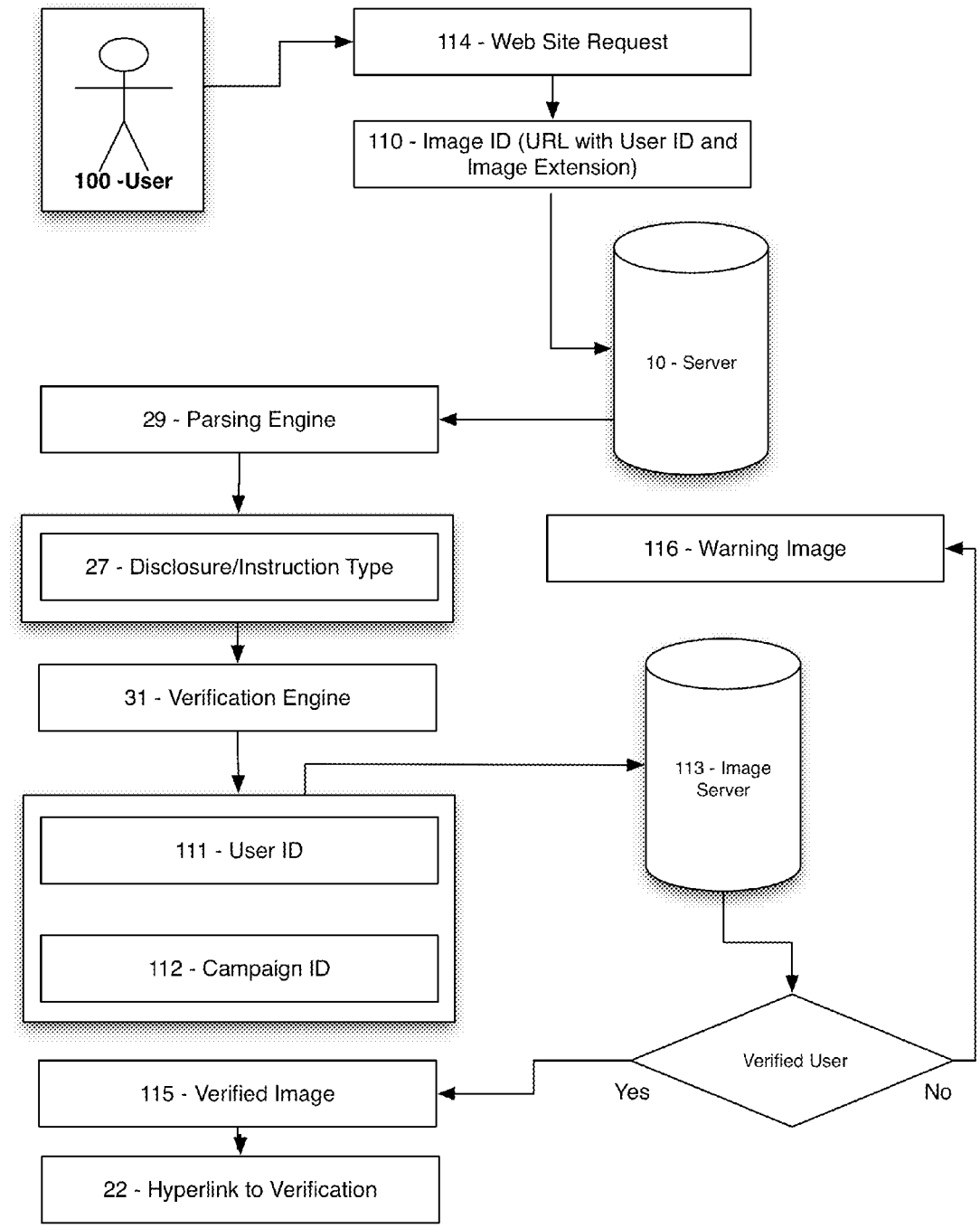

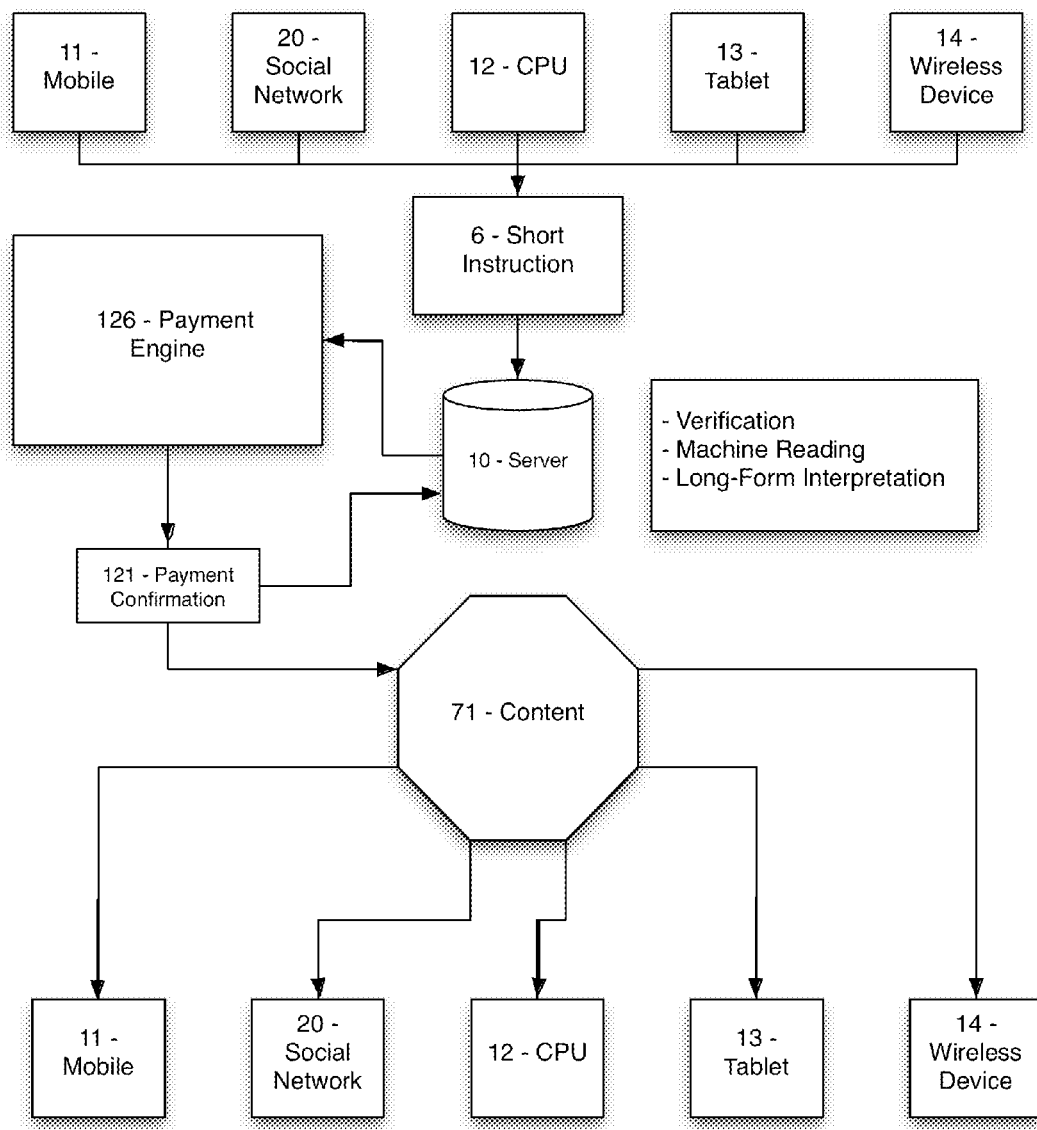

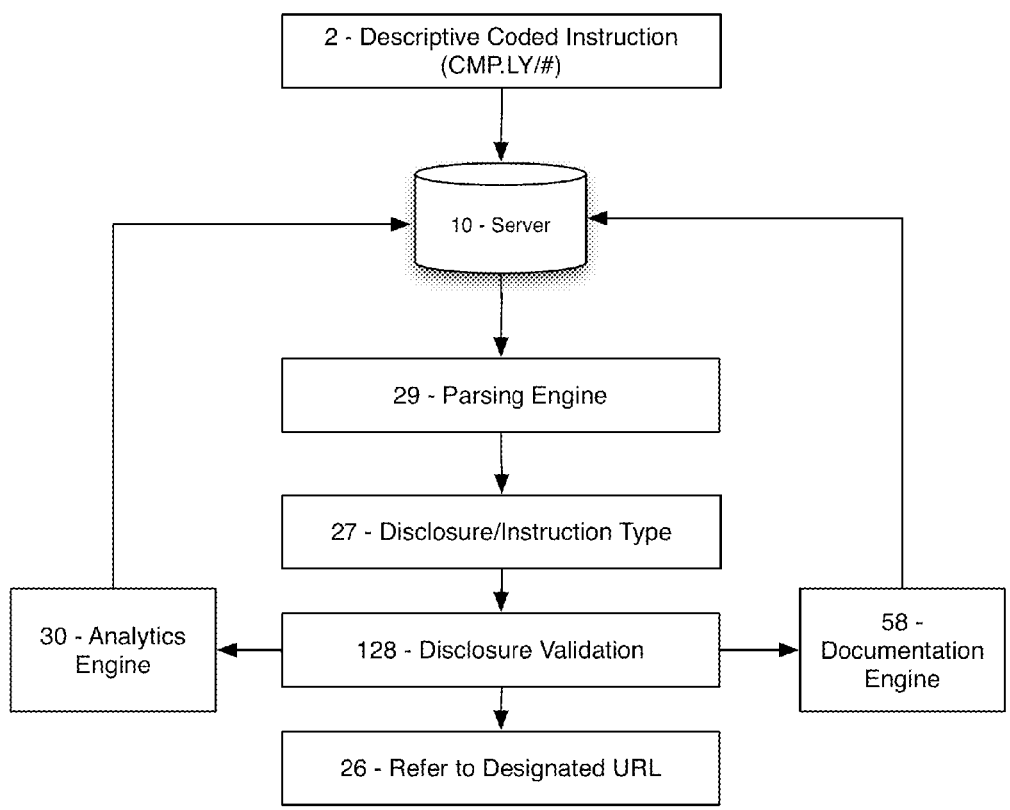

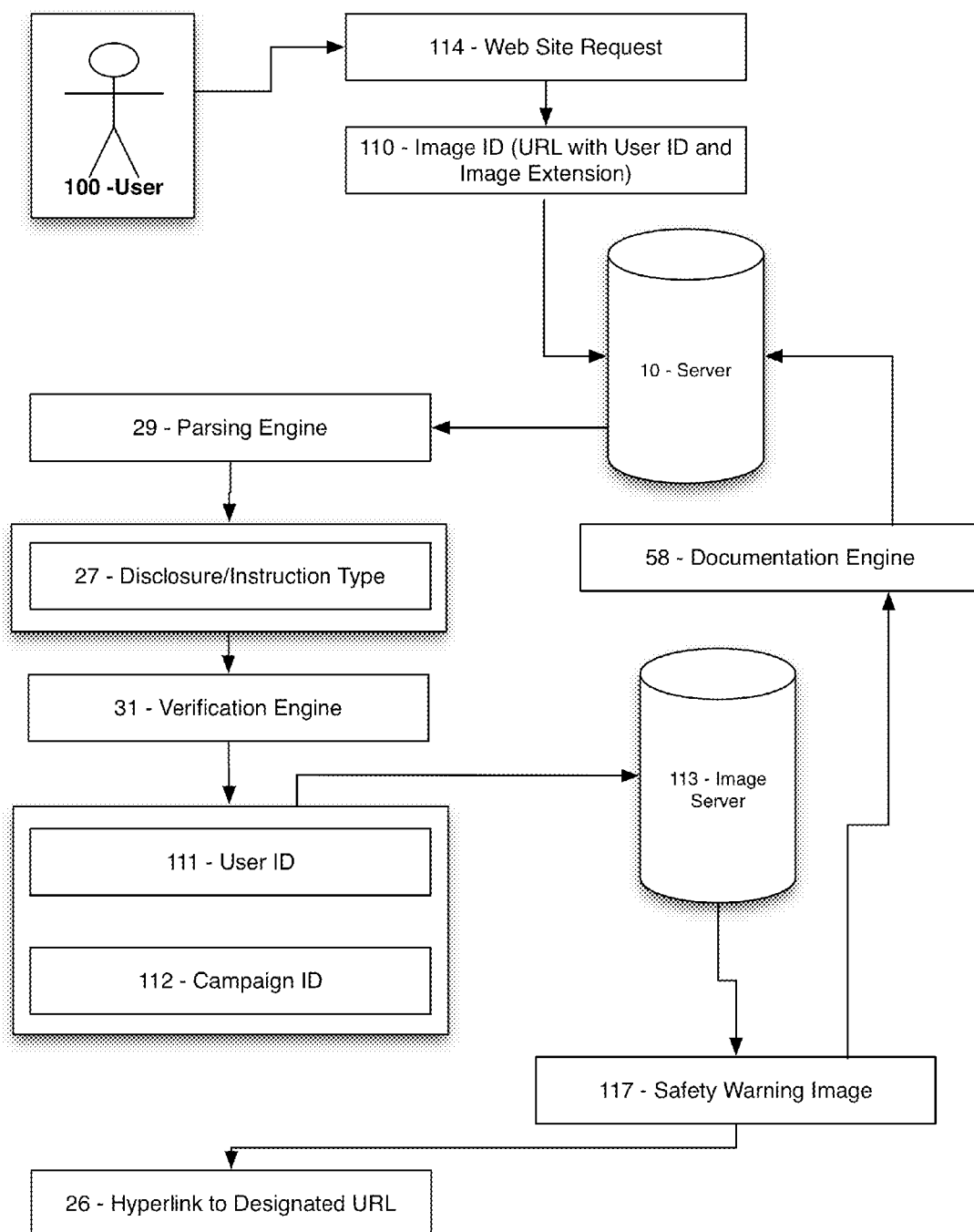

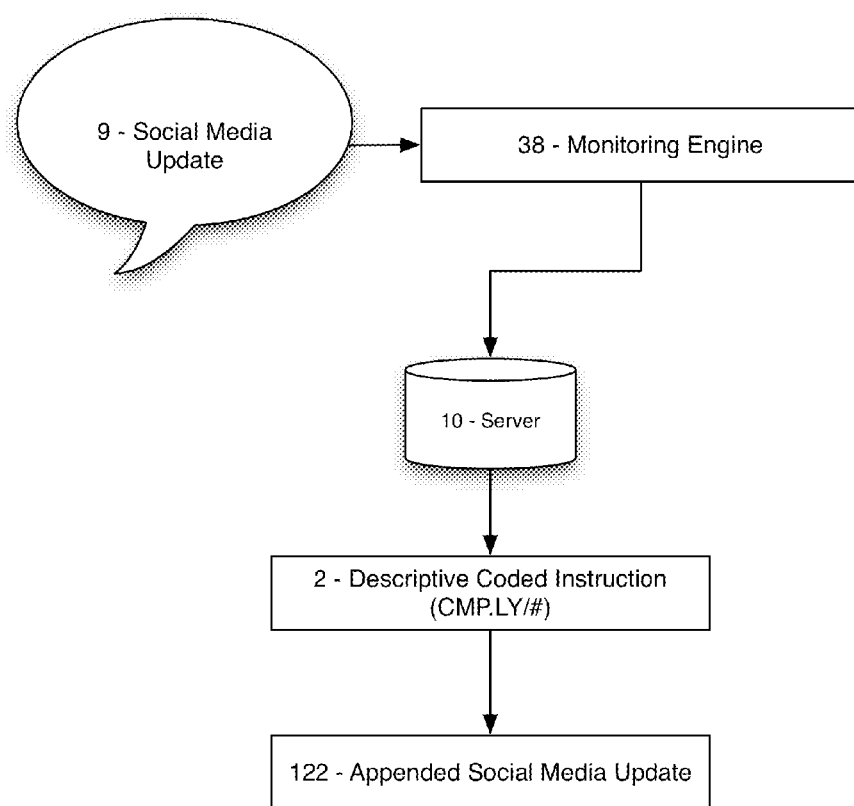

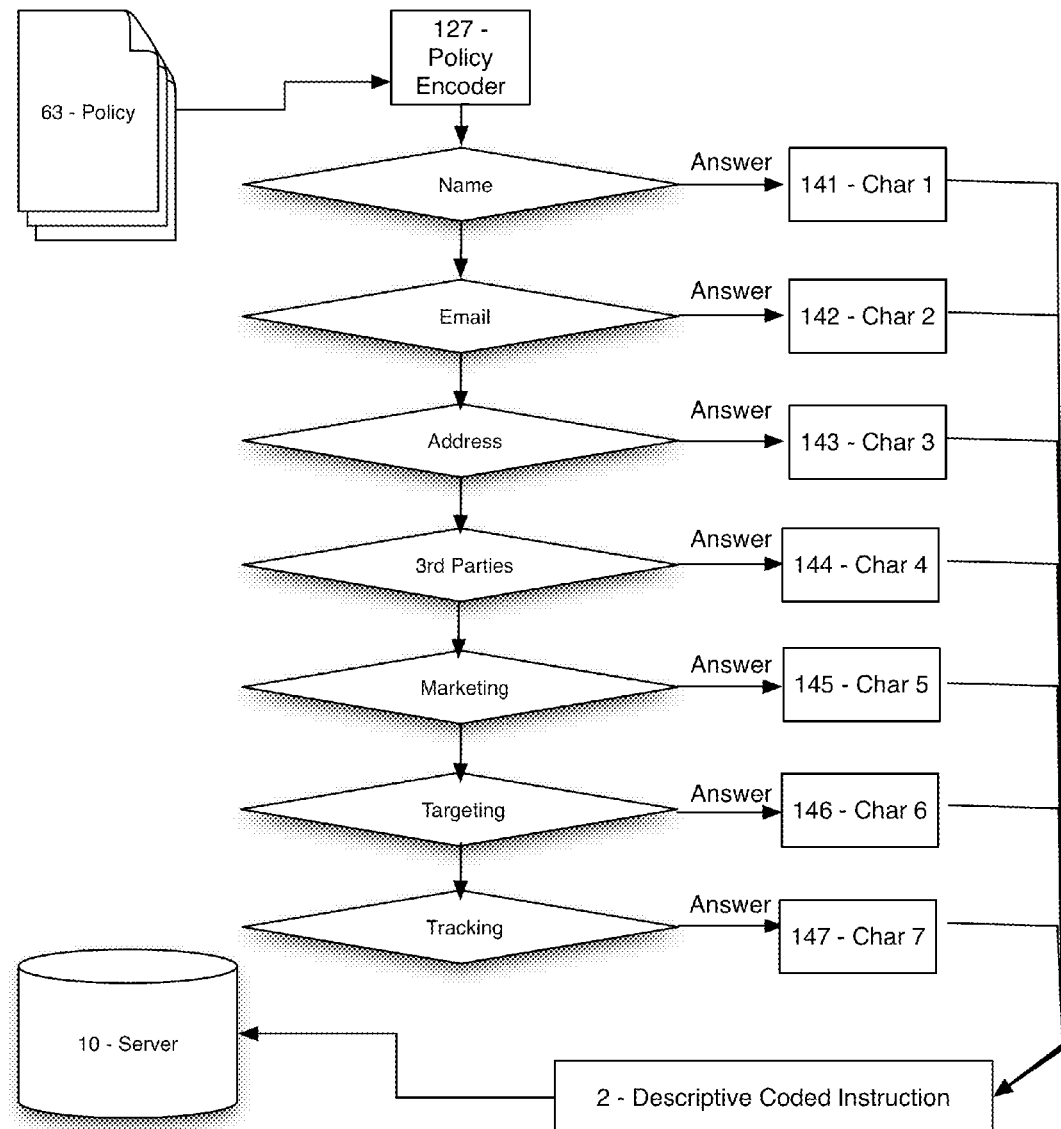

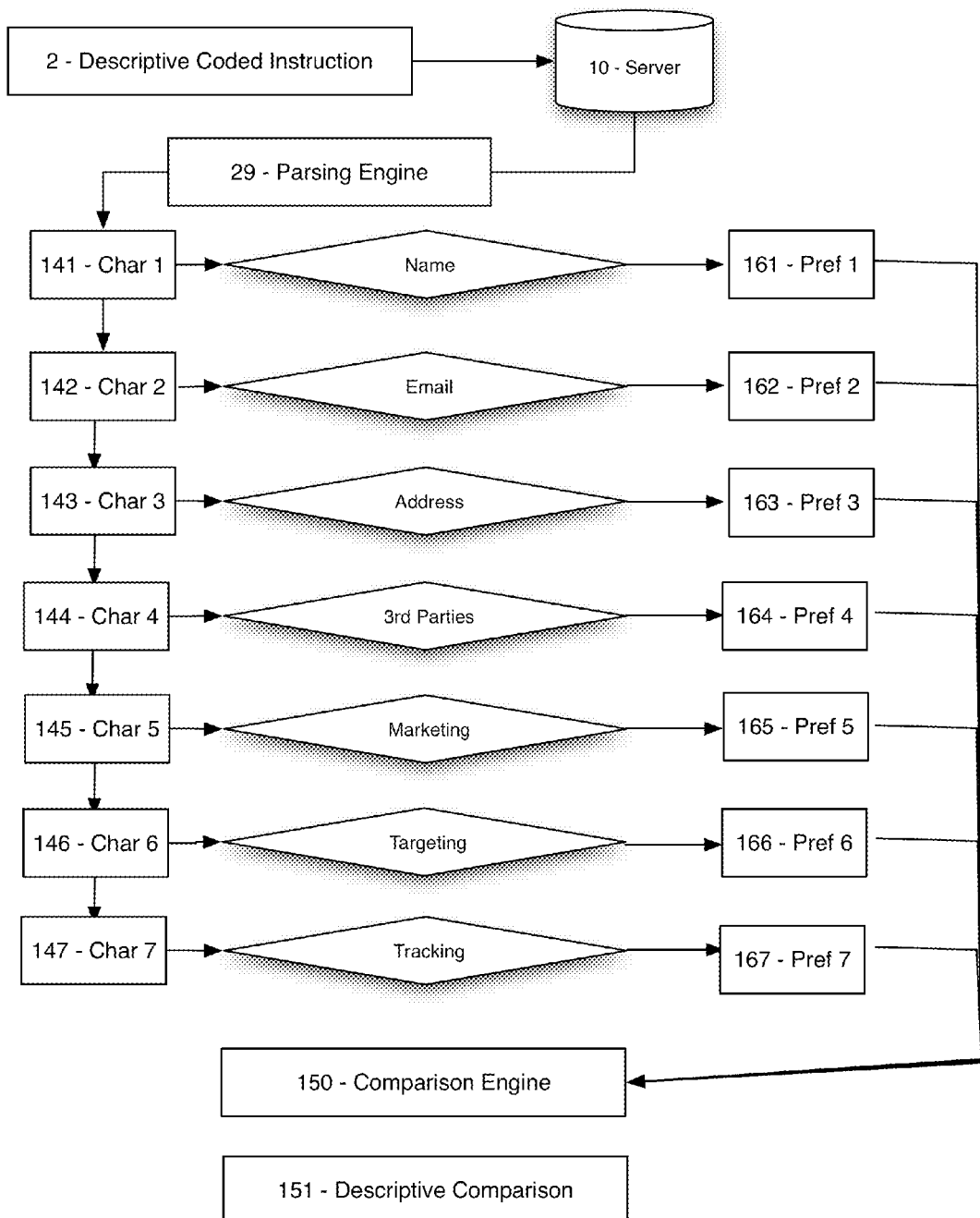

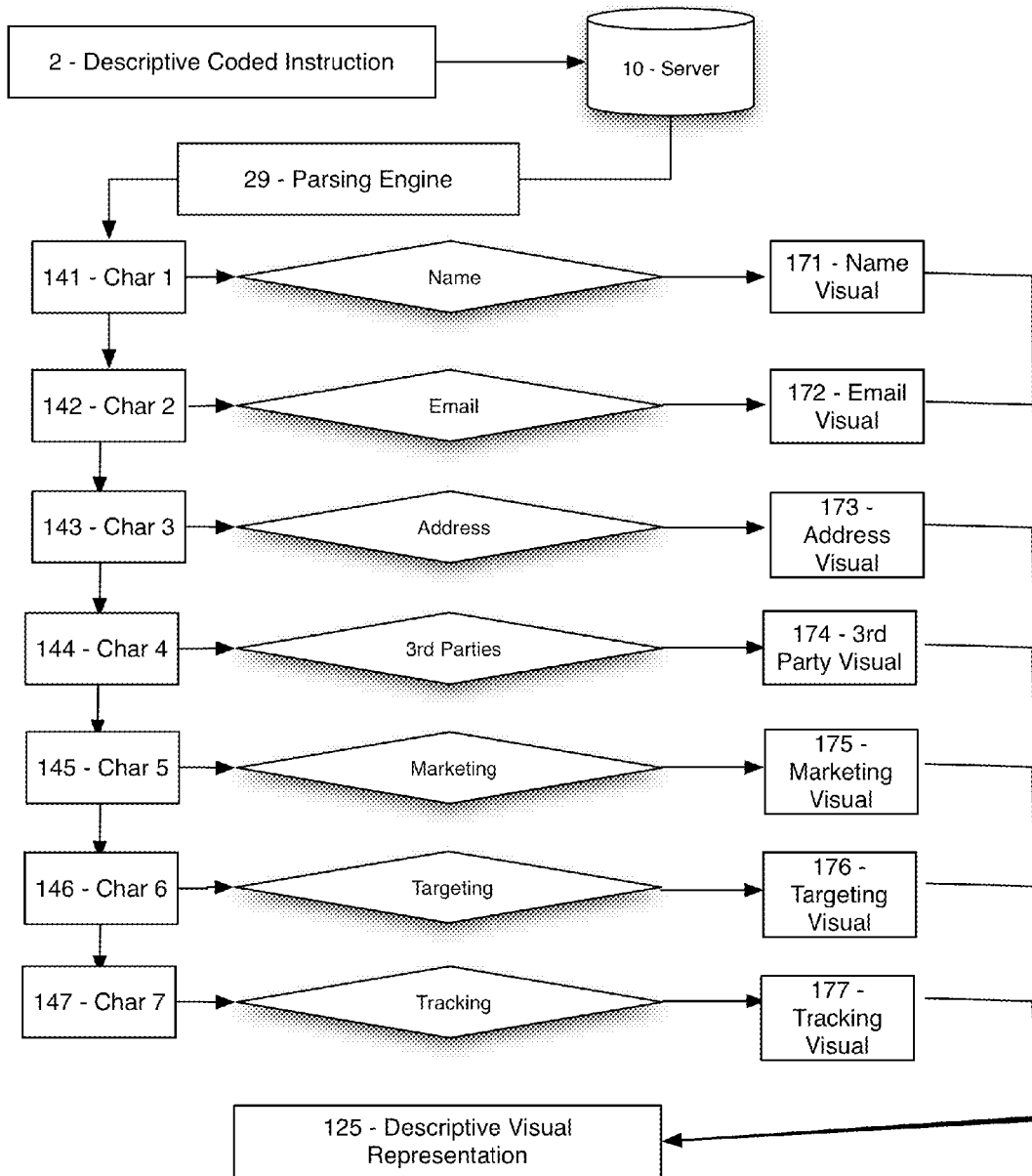

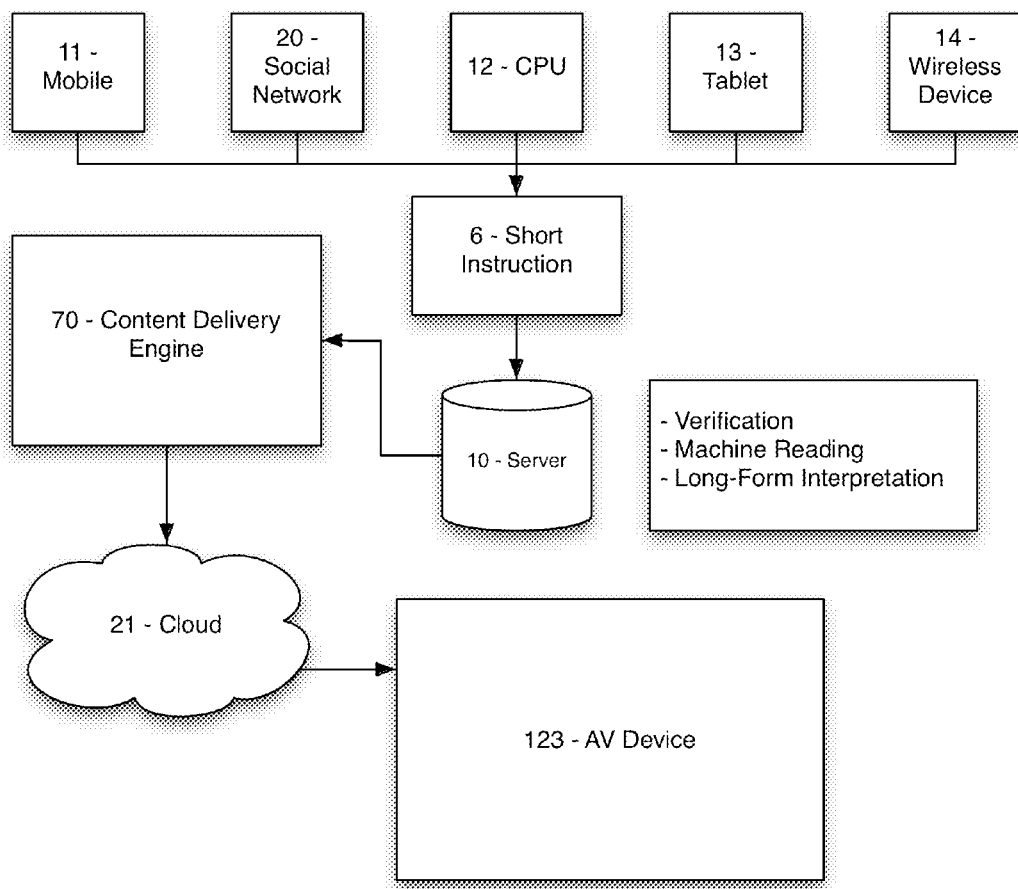

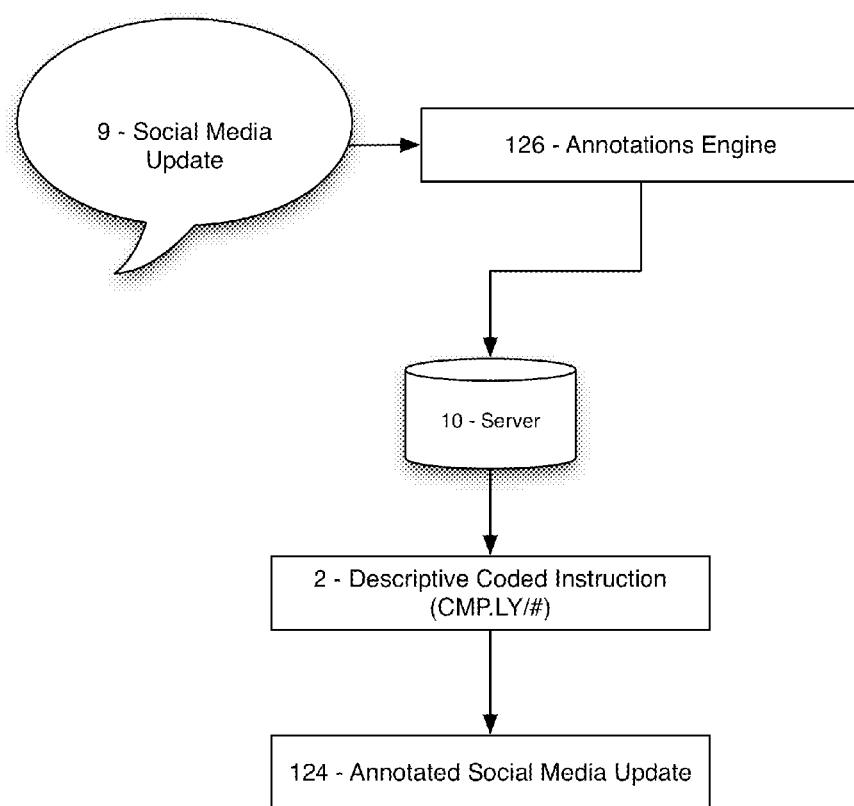

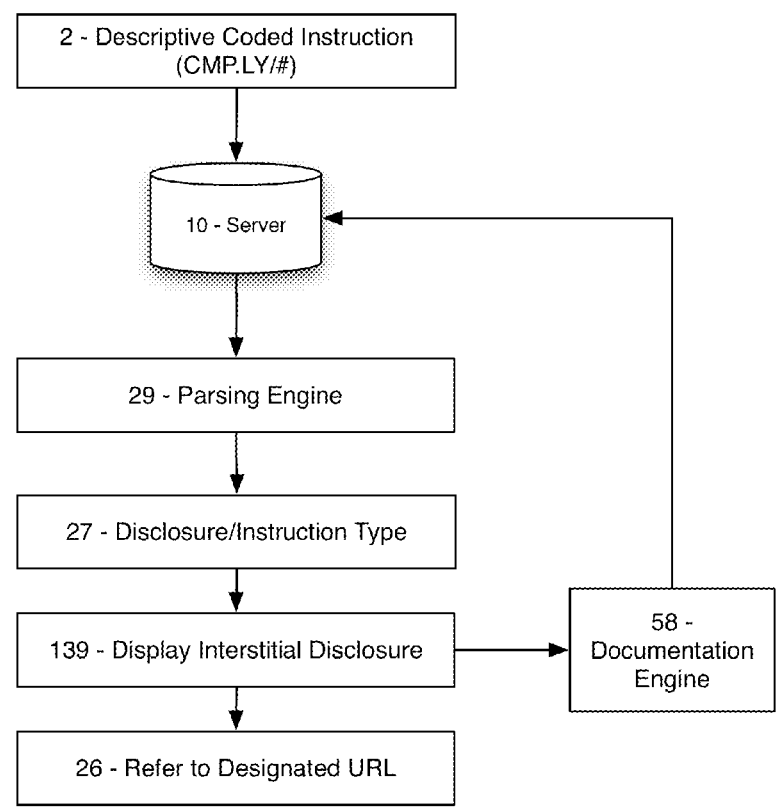

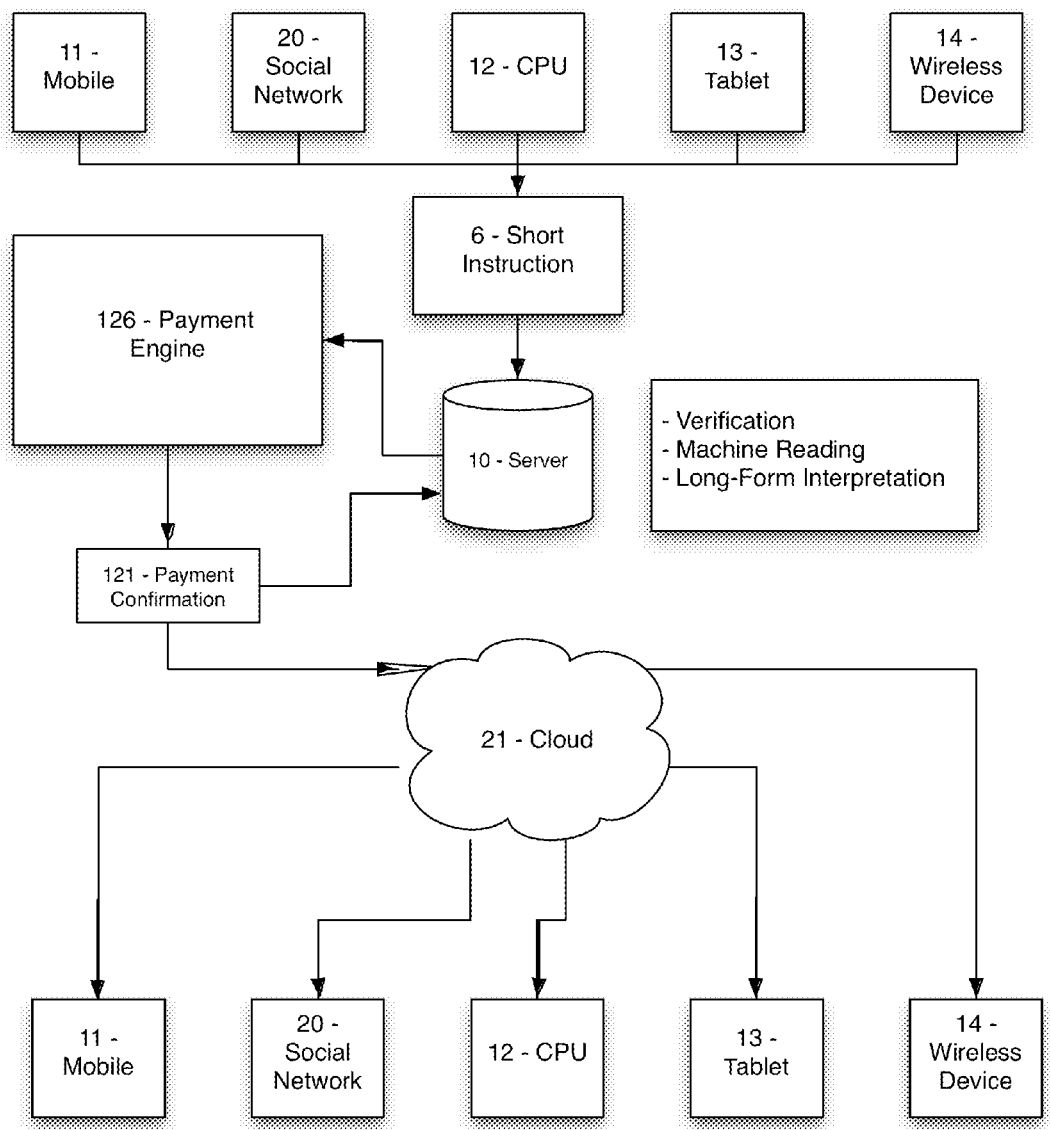

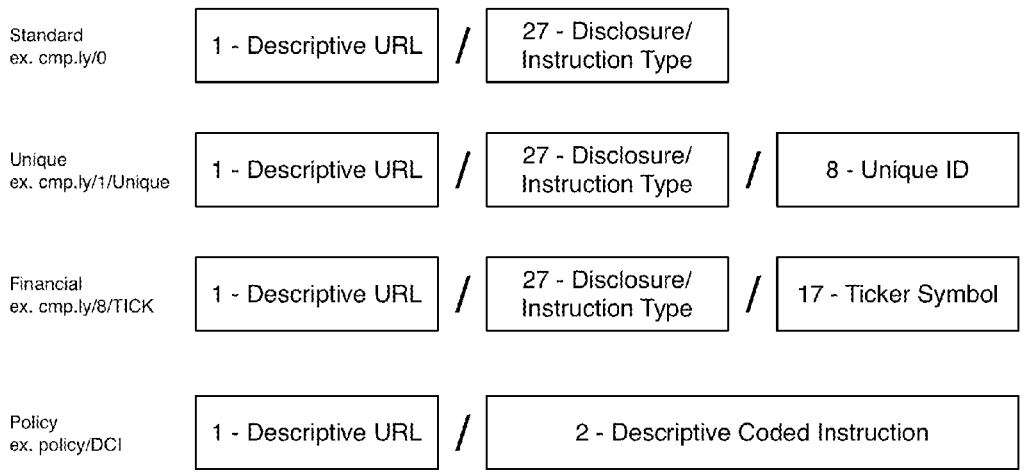

METHOD AND SYSTEM FOR INDICATING AND DOCUMENTING ASSOCIATIONS, DISCLOSURES AND INSTRUCTIONS USING VISUALLY IDENTIFIABLE DESCRIPTION

CROSS-REFERENCE TO RELATED APPLICATIONS

This application is a continuation of, claims priority to and the benefit of U.S. patent application Ser. No. 15/675,884, filed on 14 Aug. 2017, now U.S. Pat. No. 10,395,255, issued on 27 Aug. 2019, which is a continuation of and claims priority to, U.S. patent application Ser. No. 14/041,710, filed on 30 Sep. 2013, now U.S. Pat. No. 9,734,504 issued on 15 Aug. 2017, which is a continuation of, claims priority to and the benefit of, U.S. patent application Ser. No. 13/273,965, filed on 14 Oct. 2011, now U.S. Pat. No. 8,549,140, issued on 1 Oct. 2013, which claims priority to and the benefit of U.S. Provisional Patent Application Ser. No. 61/393,357, filed on 15 Oct. 2010, the disclosures of which are incorporated herein by reference in their entireties.

TECHNICAL FIELD

The disclosure generally relates to messaging and documentation in short form, space-constrained environments, in particular in social networks, messaging, data networking (e.g., internet & cloud) and telecommunications platforms. More particularly, the disclosure relates to the creation, tracking, documentation and monitoring of disclosures, statements and instructions that are visually identifiable and follow a standardized coded framework that is prima facie identifiable and is both human and machine readable.

BACKGROUND

Changes in communications platforms, increase in regulation and evolving tools for individualized media have presented unique challenges for applications operating within and across various platforms. There is a pressing need for innovative solutions that adapt conventional business practices to emerging communications channels and devices.

Short form messaging for SMS, Microblogging and Status Updates provides a unique challenge to requirements for content, documentation or instructions that cannot be fully contained in 140 or fewer characters. When these formats are used for marketing, promotion or uses that require outside processes or additional information, it is difficult to include or clearly indicate the presence of required disclosures, rules, policies, fine print, user data and instructions. When these formats are used to connect user services across mobile, social, network, cloud and server based platforms, there is a need to communicate instructions and to include clear pointers, links and indicators to additional user, privacy and disclosure information as well as to manage, document and report on settings, actions, uses and preferences. Incorporating information by reference in a standardized coded system enables users to address business, process and regulatory requirements in an elegant, efficient and easily understood framework.

Advertisers and their agencies conduct word of mouth and influencer marketing campaigns which leverage the power of social networks by contacting influential members of these communities and provide them with gifts, samples and/or payments for review and comments. There has been an increase in regulation in this space and, as a result, influencers and marketers are required to clearly disclose material connections of these relationships. One requirement for disclosure is that it applies to all communications, including short form microblogs. The challenge that is presented is that short form messages are by their nature text based and short in length (140-160 characters) which makes it difficult to include a valid disclosure to indicate the nature of the relationship, as required. The present disclosure addresses this challenge by using a coding system and/or a system of icons or badges that are readable and/or represent a disclosure or instruction that is prima facie human readable as a clear disclosure, and follows a structured and standardized coding framework which clearly indicates the specific nature of the disclosure or instruction upon reading or visually seeing the representation of the present disclosure.

Data, services, and other resources are generally identified with a resource identifier such as a uniform resource locator (URL) or other unique identifiers. Resource identifiers can become rather large, and sometimes too large to include in certain types of data elements, such as microblogs and SMS messaging. These limitations exist in content length (limit of characters), bandwidth usage (limit of throughput), processing power (limit of read/write for multiple requests or for limited use devices) and in a need to standardize request or information identifiers and annotations or metadata for delivery alongside other designated content. To enable access to the resource, a shortened resource identifier can be used by the limited capability device or platform and mapped to the full resource identifier. URL shortening is a common practice, but URL shorteners use generic links that are not prima facie identifiable as to the nature or meaning of the content being presented to the reader until the link is clicked or expanded. The present disclosure functions as a statement or instruction in all available forms, as opposed to merely and generically redirecting traffic to a disclosure, instruction or additional information.

Marketers are required to disclose certain connections or associations as well as terms, rules, instructions and disclosures in a manner that is clear to a reader in short form prior to clicking on a hyperlink or performing additional actions. The present disclosure allows for a framework of codes and references that are prima facie readable and identifiable and can be used to indicate status of a relationship, provide additional detail, direct a user to more information, or initiate a larger process on a related system or in the cloud.

Regulated and commercial industries require certain information to be delivered or displayed alongside specific content. The present disclosure uses a framework that can be used to document, track and identify certain statements or disclosures and can confirm that requirements, process or best practices were in place when displaying or delivering certain content. The present disclosure can be used to measure, report and confirm compliance.

The present disclosure and framework can be used to automate the tracking and reporting of statements, disclosures or instructions and can create an audit trail documenting the placement, associations, users and nature of reported actions. Furthermore, the present disclosure framework can be used to verify that additional information or identification were provided along with a given message or content.

Additionally, long form content such as policies, rules and documents can be reduced in size and can be standardized using the framework of the present disclosure. Coded references can then be compared to standards or preferences of an individual or of a designated group. Coded references may be used to visually represent the contents of the long form content in a visual representation of the content of the long form content or of the differences between a given document and the comparison to given preferences.

There has been a need for a centralized system to incorporate all of these functions into a single framework that can be applied to content in various forms including short form messaging, microblogs, web sites, status updates, social networks, cloud computing, telecommunications and other forms of electronic messaging. The present disclosure is just such a system.

Current methods of disclosing associations and disseminating instructions exist, but have significant limitations that are addressed within the present disclosure.

One significant limitation is that existing methods and solutions are not products and do not follow standards that allow for simple identification of the specific association, scenario and user.

Moreover, existing methods lack a centralized framework and/or repository from which to document and track users and instances. Many of the alternatives to the present disclosure rely upon Ad Hoc solutions such as hashtags, which are generic in nature and not identifiable as to source, or are text based or visual displays that are not tied to a centralized framework that allows for use across multiple platforms and environments.

These limitations, along with public concern and increasing regulatory requirements, make it highly desirable to have methods and systems in place to create, manage, track and monitor communications in short-form and long-form environments and across internet, mobile, network, cloud computing and social network environments in the manner set forth by the present disclosure.

SUMMARY

Embodiments of the present disclosure comprise methods and systems for creating and managing short form messages and instructions to document and identify specific instructions, preferences and processes. The embodiments of the present disclosure provide a standardized framework for coding and messaging preferences, affiliations and instructions.

Coding system enables clear and conspicuous disclosure, statements and instructions in a format that is prima facie readable by both humans and machines. A coded URL functions as a statement/disclosure/instruction on its own, in one embodiment, and links to additional content or processes via a standardized coding framework, in another embodiment. Built on top of standard coding system, the disclosure further allows for user identification, customization and tracking with specificity. Unique codes link back to user data, additional content, notes, instructions and custom fields. User may create and track multiple codes or instructions within unique user account.

Unique individual codes or group codes may be used for increased tracking and monitoring capabilities. In one embodiment, a documented audit trail is maintained and contains administrator actions as well as user actions. All policies, changes, preferences, reporting, documents, acceptances, instructions and emails generated are documented in a time/date stamp audit trail for each instance.

The exemplary embodiments are mentioned not to limit or define the invention, but to provide examples of embodiments of the invention to aid understanding thereof. Exemplary embodiments are discussed in the Detailed Description, and further description of the invention is provided there. Many of the advantages offered by the various embodiments of the present invention may further be understood by examining this specification.

Advantages to this disclosure over alternatives include 1) structured format and coding system for prima facie visual identification of the intended function, instruction or statement, 2) documentation of user details and additional notes, services, payment methods or content, 3) documentation through the use of audit trails and confirmations of user activities, 4) short form codes are specifically adapted for use in space-constrained environments, 5) tracking and measurement of coded references can be done with precision and specificity, 6) long processes and instructions can be reduced to short coded references and identifiers, 7) user preferences or settings for long processes or instructions can be reduced to short coded references and identifiers, 8) short coded references and identifiers of a log process and instructions can be compared to a standard or to a user, or group's, indicated preferences and 9) insertion and documentation of messaging within an existing workflow to demonstrate an affiliation, refer to additional information or further instruction.

The aspects of the disclosed embodiments are directed to a computer program product for monitoring compliance of an electronic communication with a compliance policy includes non-transitory computer readable code means, the non-transitory computer readable code means when executed by a processor device, being configured to detect the electronic communication; identify a keyword in the electronic communication that is associated with the compliance policy; determine if the electronic communication includes a compliance disclosure associated with the compliance policy; and provide a notification if the electronic communication does not include the compliance disclosure.

In one embodiment, the compliance disclosure comprises a compliance URL, the compliance URL comprising a disclosure type code and a target code, and is linked to the compliance policy, the disclosure type code being selected from a data base of disclosure type codes, the target code being specific to the monitored target.

The aspects of the disclosed embodiments are directed to an automated computer detection and monitoring system for monitoring an electronic communication of a monitored target for a short instruction or command, the system comprising a controller in communication with a computing device, the controller having a memory including programming instructions that when executed by a processor are configured to cause the controller to: form a short instruction URL comprising a base URL and generating a second portion of said URL by concatenation of a base URL with the target code, said target code being specific to the monitored target, link said target URL with a predetermined policy, generate a data base of keywords relevant to the target URL and upon detection of an electronic communication by said monitored target that includes a keyword from the database of keywords or a target URL to generate an alert based upon the presence of a designated keyword or of a target URL or the omission of a designated keyword or target URL, store that alert and sending a notification to program administrator and/or alternative response mechanism.

In one embodiment, a short instruction contained in an electronic communication is in the form of a target URL.

In one embodiment, a short instruction contained in an electronic communication is in the form of a keyword.

In one embodiment, a short instruction contained in an electronic communication is in the form of a target phrase.

In one embodiment, a short instruction contained in an electronic communication is in the form of a Hashtag reference.

In one embodiment, a short instruction contained in an electronic communication is in the form of an image.

In one embodiment, a short instruction contained in an electronic communication is in the form of a coded instruction In one embodiment, connecting specified accounts to the automated computer detection and monitoring system via application programming interface or open authorization.

In one embodiment, specific accounts are connected to a program for the purpose of conforming to a policy and for monitoring of communications from that specified account.

In one embodiment, specific accounts are connected to a program for the purpose of conforming to a policy and for measurement of communications from that specified account.

In one embodiment, a message from a monitored target is attributed to an authorized account.

In one embodiment, an alert from a monitored target account is attributed to an authorized account.

In one embodiment, a short instruction from a monitored target account is attributed to an authorized account.

In one embodiment, a specific device or account is attributed to an authorized account.

In one embodiment, a short instruction is attributed to an authorized account and a specific instruction based upon a pre-existing policy.

In one embodiment, a short instruction is attributed to an authorized account, a specific device and a specific instruction based upon a pre-existing policy.

In one embodiment, a short instruction is attributed to an authorized account, a specific function and a specific instruction based upon a pre-existing policy.

In one embodiment, a short instruction is initiated by any member of a designated group.

In one embodiment, a short instruction is initiated by multiple members of a designated group.

In one embodiment, a short instruction is initiated by all members of a designated group.

BRIEF DESCRIPTIONS OF THE DRAWINGS

These and other features, aspects and advantages of the present disclosure are better understood when the following Detailed Description is read with reference to the accompanying drawings, wherein:

FIG. 1 illustrates item descriptions for the representative diagrams of exemplary systems of the present disclosure;

FIG. 2 illustrates a block diagram of one embodiment of a Standard Disclosure coding system in accordance with an embodiment of the present disclosure;

FIG. 3 illustrates a block diagram of one embodiment of a Unique Disclosure coding system in accordance with an embodiment of the present disclosure;

FIG. 4 illustrates a block diagram of one embodiment of a Campaign Disclosure Admin coding system in accordance with an embodiment of the present disclosure;

FIG. 5 illustrates a block diagram of one embodiment of a Campaign Disclosure User coding system in accordance with an embodiment of the present disclosure;

FIG. 6 illustrates a block diagram of one embodiment of a Financial Disclosure coding system in accordance with an embodiment of the present disclosure;

FIG. 7 illustrates a block diagram of one embodiment of a Network to Device coding system in accordance with an embodiment of the present disclosure;

FIG. 8 illustrates a block diagram of one embodiment of a Network to Cloud to Device coding system in accordance with an embodiment of the present disclosure;

FIG. 9 illustrates a block diagram of one embodiment of a Network to Cloud to Device coding system in accordance with an embodiment of the present disclosure;

FIG. 10 illustrates a block diagram of one embodiment of an Image Load Tracking coding system in accordance with an embodiment of the present disclosure;

FIG. 11 illustrates a block diagram of one embodiment of a Safety Warning coding system in accordance with an embodiment of the present disclosure;

FIG. 12 illustrates a block diagram of one embodiment of a Verified ID coding system in accordance with an embodiment of the present disclosure;

FIG. 13 illustrates a block diagram of one embodiment of a Payments coding system in accordance with an embodiment of the present disclosure;

FIG. 14 illustrates a block diagram of one embodiment of a One Click Link coding system in accordance with an embodiment of the present disclosure;

FIG. 15 illustrates a block diagram of one embodiment of an Image Obfuscation coding system in accordance with an embodiment of the present disclosure;

FIG. 16 illustrates a block diagram of one embodiment of an Appending coding system in accordance with an embodiment of the present disclosure;

FIG. 17 illustrates a block diagram of one embodiment of a Policy Documentation coding system in accordance with an embodiment of the present disclosure;

FIG. 18 illustrates a block diagram of one embodiment of a Policy Comparison coding system in accordance with an embodiment of the present disclosure;

FIG. 19 illustrates a block diagram of one embodiment of a Policy Representation coding system in accordance with an embodiment of the present disclosure;

FIG. 20 illustrates a block diagram of one embodiment of an Interactive Audio/Visual Platform coding system in accordance with an embodiment of the present disclosure;

FIG. 21 illustrates a block diagram of one embodiment of an Annotations Platform coding system in accordance with an embodiment of the present disclosure;

FIG. 22 illustrates a block diagram of one embodiment of an Interstitial Platform coding system in accordance with an embodiment of the present disclosure;

FIG. 23 illustrates a block diagram of one embodiment of an Payment Platform coding system in accordance with an embodiment of the present disclosure; and FIG. 24 illustrates a block diagram of one embodiment of a Disclosure Platform coding system in accordance with an embodiment of the present disclosure.

DETAILED DESCRIPTION

Embodiments of the present disclosure comprise methods and systems for creating and managing short form messages and instructions to document and identify specific instructions, preferences and processes. The embodiments of the present disclosure provide a standardized framework for coding and messaging preferences, affiliations and instructions as well as the documentation, tracking and monitoring of those coded references.

The following description is merely exemplary in nature and is not intended to limit the present disclosure, application, or uses.

The present disclosure now will be described more fully hereinafter with reference to the accompanying drawings, which form a part hereof, and which show, by way of illustration, specific exemplary embodiments by which the disclosure may be practiced. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely software embodiment, an entirely hardware embodiment or an embodiment combining software and hardware aspects. The following detailed description is, therefore, not to be taken in a limiting sense. Briefly stated, aspects of the present disclosure are directed towards enabling access to a network resource in a shortened URL or Descriptive Coded Instruction that follows a defined and structured standardized framework. Although the disclosure is not so limited, an exemplary embodiment is described below in terms of communicating a shortened URL from a device to another device and that determines a corresponding full URL or instruction and directs an access request to the full URL, instruction or designated content/process.

Further, while the following disclosure is made with respect to the delivery of disclosures and instructions, it should be understood that the systems and methods disclosed herein could also be used for delivery of media in any media content type, for example, audio, music, data files, web pages, etc. and for delivery and documentation of processes or instructions for methods operating on related or independent platforms on the same servers, alternate servers, alternate devices or in the cloud. Additionally, throughout this disclosure, reference is made to data, information, programs, media, assets, video data, etc., however, it will be readily apparent to persons of ordinary skill in the art that these terms are substantially equivalent in reference to the example systems and/or methods disclosed herein.

FIGS. 1-24 illustrate multiple embodiments of the present disclosure. However, not all of the components illustrated in the figures may be required to practice the disclosure, and variations in the arrangement and type of the components may be made without departing from the spirit or scope of the disclosure.

The system and method shown in FIGS. 2-24 and the present disclosure comprises multiple client devices. These devices may include virtually any computing device capable of receiving and sending a message over a network, to and from another computing device, such as server, each other, and the like. The set of such devices may include devices that are usually considered limited capability devices or specialized devices, such as mobile devices that typically connect using a wireless communications medium such as cell phones, smart phones, pagers, walkie talkies, radio frequency (RF) devices, infrared (IR) devices, CBs, navigation devices, integrated devices combining one or more of the preceding devices, or virtually any mobile device, and the like. Similarly, client devices may be any device that is capable of connecting using a wired or wireless communication medium such as a personal digital assistant (PDA), POCKET PC, wearable computer, networked home appliances, cloud and social networks, and any other device that is equipped to communicate over a wired and/or wireless communication medium. The set of such devices may also include devices that are usually considered general purpose devices and often connect using a wired communications medium such as personal computers, multiprocessor systems, microprocessor-based or programmable consumer electronics, network PCs, and the like.

Each client device within client devices includes a user interface that typically enables a user to control settings, and to instruct the client device to perform operations. Each client device also includes a communication interface that enables the client device to send and receive messages from another computing device employing the same or a different communication mode, including, but not limited to short message service (SMS) messaging, multi-media message service (MMS) messaging, email, instant messaging (IM), internet relay chat (IRC), MardamBey's internet relay chat (mIRC), Jabber, and the like. Client devices may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible HyperText Markup Language (xHTML), Extensible Markup Language (XML), a wireless application protocol (WAP), a Handheld Device Markup Language (HDML), such as Wireless Markup Language (WML), WMLScript, JavaScript, and the like.

Unlike a generic URL shortener which does not give the reader an indication of the location or nature of the content until after the link is clicked or expanded, the present disclosure creates a URL or Descriptive Coded Instruction that is prima facie identifiable upon human reading and provides a machine readable set of instructions for identification and further instruction. In FIG. 4, Coding Structure, by reading Descriptive URL 2, determine the Disclosure/Instruction Type 27, and may also include further information from Unique ID 8, Ticker Symbol 17, or other identifier. A viewer or reader can determine the nature of a connection or opportunity before clicking a hyperlink or taking further action.

Embodiments of the present disclosure comprise methods and systems for indicating and documenting associations using visually descriptive and/or identifiable instructions and a standardized framework of coded instructions.

Members of social networks maintain blog, microblog and social network accounts. Advertisers and their agencies conduct word of mouth and influencer marketing campaigns which leverage the power of social networks by contacting influential members of these communities and provide them with gifts, samples and payments for review and comments. There has been an increase in regulation in this space and, as a result, influencers and marketers are required to clearly disclose material connections of these relationships. One requirement for disclosure is that it applies to all communications, including short form microblogs. The challenge that is presented is that short form messages are by their nature text based and short in length (140-160 characters) which makes it difficult to include a valid disclosure to indicate the nature of the relationship, as required.

Therefore, the present disclosure addresses this challenge by using a coding system, interstitial messaging and/or a system of icons or badges that are readable and/or represent a disclosure or instruction that is prima facie human readable as a clear disclosure, and follows a structured and standardized coding framework which clearly indicates the specific nature of the disclosure or instruction upon reading or visually seeing the representation of the present disclosure.

In another embodiment, the nature of the disclosure or instruction under the present disclosure is clear to a human or machine reader before clicking a hyperlink or taking further action to obtain additional information. The prima facie nature of the disclosure or instruction in itself may constitute a full disclosure or instruction without any further interaction. Furthermore, the present disclosure may include unique information in a coded framework that specifically identifies the user and the instruction contained therein.

In another embodiment, the present disclosure may insert a disclosure or other messaging in a visual display that precedes the redirect of a URL request in order to present that message to the user for the purposes of making a statement, disclosure or other notice.

In another example embodiment, the present disclosure relates to human and machine-readable standardized shortened codes and or icons/badges that are visually identifiable as clear instructions and indications of longer form instructions, commands and disclosures.

In another example embodiment, the present disclosure relates to the handling of general and specific disclosures and statements of users for public and/or private reference.

In another example embodiment, multiple or various embodiments of the present disclosure may be combined. Uses of the present disclosure can be modified, expanded, qualified or customized for specific user use cases or to initiate other requests, instructions or processes.

In another embodiment, a designated URL or Descriptive Coded Instruction can be used to identify a specific content selection as a disclosure or statement. Inclusion on a coded reference in the standardized format at a designated location can indicate that a disclosure has been made. The presence of that certain code in a designated location can trigger alerts or syndication of that content using a method, process or instruction that has been designated. Alerts and syndication can be connected to all uses or to specific user and/or embodiments.

In another embodiment, a visual display, badge or link can be used to provide additional messages, warnings, information or documentation with regard to the content that appears in an electronic message or posting. This display can clearly indicate to a viewer or reader that there is additional information available and point the user to that information directly through the use of hyperlinks, mouseover, annotation, interstitial messaging or additional display. The placement and use of the element can be tracked and documented in an audit trail, electronic record or report for measurement and to confirm compliance and presence of required messaging alongside the designated content. In addition, the content may be updated, located or recalled at a later time should revisions or updates be necessary.

In another embodiment, the present disclosure may be used to include a statement, disclosure or additional information within a space-constrained platform through the use of a coded URL or Descriptive Coded Instruction framework which indicates prima facie that additional information is available which relates to the content of that message, and which provides a hyperlink mouseover, annotation, interstitial messaging or additional display to that additional information.

In another embodiment, a coded instruction can be used to indicate that a disclosure of connection, rules, or additional content is available. The prima facie structure of the present disclosure serves as notice of additional content or qualifications, and provides a direct hyperlink to obtain that additional information. Furthermore, the coded instruction and hyperlink, mouseover, annotation, interstitial messaging or additional display may be embodied in a URL, visual element, icon, badge or other mechanism.

In another embodiment, a Descriptive Coded Instruction may be a URL, Shortened URL, code, visual display or other designated symbol or character.

FIG. 1 includes references to item descriptions for example embodiments. These item descriptions and embodiments are provided so that this disclosure will be thorough and complete, and will fully convey the scope of the disclosure to those skilled in the art. Additionally, reference is made to items and descriptions including data, information, programs, media, assets, video data, etc., however, it will be readily apparent to persons of ordinary skill in the art that these terms are substantially equivalent in reference to the example systems and/or methods disclosed herein.

In another embodiment, the present disclosure may use coding that follows a standardized framework that provides for a numbered or symbol-based format wherein each number or symbol relates to a specific Disclosure/Instruction Type 27.

In another embodiment, the present disclosure may use a number or symbol that follows a given Descriptive Coded Instruction 2 or designated structured format that indicates a specific Disclosure/Instruction Type 27 conforming to a standard and is therefore readable and identifiable by human and machine reading.

In another embodiment, the present disclosure may further qualify a Descriptive Coded Instruction 2 that follows the general standard format by adding a Unique ID 8 or Ticker Symbol 17.

In another embodiment, the present disclosure may use a number or symbol and that number or symbol's specific placement or structure to indicate a specific preference or instruction based upon confirmation to a standard, and is therefore readable and identifiable by human and machine reading.

In another embodiment, the present disclosure may use a designated or randomized number, symbol or Unique ID 8 to identify a specific user, process or instruction.

In another embodiment, the present disclosure enables users to make statements, disclosures or include additional information in space-constrained platforms and to include those statements directly in the body of that content, clearly identifiable by reading or seeing the coded framework, with the ability to hyperlink to additional content, information or description. This is significant in that many of the details that are required to give messages context or definition cannot be included in messages in full text due to the space constraints of these platforms, but in many cases this additional information is required and relevant to the content that is being created and shared.

In another embodiment, the user can self-declare a disclosure. The user selects from a choice of Disclosure/Instruction Types 27 in the framework and uses a standardized disclosure code to indicate the status of a material connection. A designated Descriptive Coded Instruction 2 or Universal Resource Locator (URL) is used to represent a material connection and make the required disclosure. The short URL is identifiable prima facie as it follows the specified standardized framework.

In another embodiment, the user can self-declare a unique disclosure. The user must login or create an account, select a standard disclosure in the framework and then may add relevant notes or information to qualify the specific disclosure or status of a material connection. The disclosure that is created includes a Unique ID 8 that is identifiable and trackable to the Disclosure/Instruction Type 27, User ID 100 and notes that have been indicated. A Descriptive Coded Instruction 2 represents a material connection and includes a unique ID that links to additional content and/or details and is identifiable, trackable and identifiable to a specific user or use case.

In another embodiment, the present disclosure uses number or symbol references to specific disclosure statements. For example, the following coding framework indicates relevant disclosures utilizing the present disclosure:

http://domain-name/User_ID; or
http://domain-name/Type; or
http://domain-name/Type/User_ID; or
http://domain-name/Type/Campaign_ID
http://domain-name/Type/TICK
http://domain-name/TICK Upon reading the given URL based statement of the present disclosure, the human or machine reader can infer the nature of the statement from the prima facie domain name. In another embodiment, the nature of the disclosure from the given Type that is represented in the statement. In another embodiment, the user ID indicates the specific user, policy, statement or additional information is available or referenced. Given URL examples are merely exemplary, and order, format or structure may change.

FIG. 24 illustrates a sample structure of a shortened URL in the standardized framework as follows:

http://domain-name/Type; or
http://domain-name/Type/User_ID; or
http://domain-name/Type/Campaign_ID Where Type is a single character or multiple character reference to a specific type and User_ID and/or Campaign_ID are a single character or multiple character reference identifiable to a specific user or instance. Character may refer to alphabetic, alphanumeric, full ASCII 256 8-bit combinations or symbol references.

Another sample structure of a shortened URL in the standardized framework is as follows:

http://domain-name/Type/Company_ID; or
http://domain-name/Unique_Code; or

Where Type is a single character or multiple character reference to a specific type and Company_ID and/or Unique_Code are a single character or multiple character reference identifiable to a specific user or instance.

In another embodiment, (FIG. 5) an advertiser can invite a user into a program that has been pre-populated. In this case, the administrator pre-selects a disclosure from the standardized framework, adds notes, process, policy and best practice instructions to be shared with an individual or group of users. The administrator can then invite users to join their pre-selected disclosure in order to participate in a marketing program. When the user follows the given invitation hyperlink, they are presented with the details of the pre-selected disclosure statement. When the user accepts the pre-selected terms, a unique disclosure code is generated for that user under the terms of that specific disclosure. In addition, all of the steps of creating the disclosure are documented in an audit trail and all of the accepted users are visible to the administrator of that disclosure.

In other embodiments, (FIGS. 7, 8, 9) a Designated Coded Instruction 27 can be implemented to schedule or trigger an action or process on a specific device directly or through a network, cloud or server. This function can validate the requestor, identify the content or nature of the instruction or process desired, represent the user account, and enable content to be requested and or shared between multiple platforms including social networks, mobile devices, CPUs, servers, connected devices and networks.

In another embodiment, a specific channel or user account can be monitored for instructions that can be verified as initiated by a given user based upon the device or user profile that initiates the request. The coding framework of the present disclosure allows for coded references to embody user information and specific instructions that can be monitored and interpreted as instructions for further processing.

In another embodiment, a badge, icon or visual display image can be used to represent a material connection, relationship or instruction. The image representation can correspond to a standard disclosure, or to a unique standard disclosure. The badge can be used in addition to the display of the Distinctive Coded Instruction/URL or the URL may be incorporated into the coding of the image and the display method.

In another embodiment, (FIG. 12) the present disclosure may be used to verify that a given communication is representative of a specific entity. A visual display or designated coded link can provide visual verification and can hyperlink to more information and additional verification. By following the coding framework of the present disclosure, all uses can be tracked and uniquely identifiable.

In another embodiment, (FIG. 14), a user can identify a specific destination for the shortened URL redirect. Unlike a generic URL shortener, the present disclosure creates a URL that is prima facie identifiable as a disclosure and then redirects traffic to a designated location for content. The reader is alerted to a material connection upon seeing the link, and then follows that link to access the desired content. Analytics measurement can be triggered upon redirect to provide additional tracking, reporting and feedback.

In another embodiment, (FIG. 16), the present disclosure may automatically append a message sent from a designated user account with a coded URL indicating that additional information or disclosures are available and providing a hyperlink to that additional information.

In another embodiment, (FIG. 17), a Descriptive Coded Instruction or structured URL instruction can be used to indicate the nature of a policy or long form document that has been coded to be set to a standardized framework. Each digit in a coding framework can be structured to represent a specific attribute of the underlying policy or document.

In another embodiment, (FIG. 17), a Descriptive Coded Instruction or structured URL that indicates the nature or contents of a longer policy, document or instruction can incorporate specific references to the longer policy, instruction or document by following a specific coding structure wherein the specific placement of a particular number, symbol or character indicates the type of content in the longer policy, instruction or document that is being referenced and the specific number, symbol or character used in that specific order in the coding structure refers to a specific measure, level, instruction, reference, access or permission as measured against a standard or representation of the longer instruction in short form so as to be readable and understandable by human or machine reading.

In another embodiment, (FIG. 18), a Descriptive Coded Instruction or structured URL that indicates the nature or contents of a longer policy or document can be machine readable to interpret or understand the long form document and make representations based upon that reading. These readings might be used to compare the long form document format, contents or parameters against a personal user's preferences or a designated group's preferences. Furthermore, these readings might be used to enable user choice or preferences based upon the representations of the contents of the long form document.

In another embodiment, (FIG. 19), a Descriptive Coded Instruction or structured URL that indicates the nature or contents of a longer policy or document can be machine readable to interpret or understand the long form document and make representations based upon that reading. These might include displaying the format, contents or parameters of the long form document in a visual display of the policy or document terms against a standards based template.

It should be noted that the names used herein, including, for example, "CMPLY," "CMP.ly," and "Disclosure," are merely illustrative, and any suitable terms may be used to label the entities described herein and illustrated in FIGS. 1-24.

It will also be understood that the foregoing is only illustrative of the principles of the disclosure, and that various modifications can be made by those skilled in the art without departing from the scope and spirit of the disclosure.

In another embodiment, (FIG. 2) Standard Disclosure, a Descriptive Coded Instruction 2, is used to indicate the presence of an association or instruction. Upon following the given Descriptive Coded Instruction 27, the Server 10, uses a Parsing Engine 29 to determine the appropriate Disclosure/Instruction Type 27, based upon the Descriptive Coded Instruction and links to a display of the Display Full Disclosure 28.

In another embodiment, (FIG. 3) Unique Disclosure, a Descriptive Coded Instruction 2, is used to indicate the presence of an association or instruction. Upon following the given Descriptive Coded Instruction 27, the Server 10, uses a Parsing Engine 29 to determine the appropriate Disclosure/Instruction Type 27, based upon the Descriptive Coded Instruction 27, and the Unique ID 8 and then links to a display of the Display Full Disclosure 28 with notes associated to Unique ID 8.

In another embodiment, (FIG. 4) Campaign Disclosure Administrator, User Administrator 101 logs into the system with an Admin Login 105, selects a Disclosure/Instruction Type 27, Enters a Brand Name 60, Campaign Name 61, Notes 62 and/or Policy 63 and submits to the Server 10. The Server 10 creates an Invitation and documents User Administrator 101 actions within the system in the Audit Trail 34, Tracking Engine 33 and/or Reporting Engine 37.

In another embodiment, (FIG. 5) Campaign Disclosure, the User 100 receives an Invitation 64 and uses a User Login 104 to access the system. User 100 reviews Policy 63 and Notes 62 and indicates acceptance of terms with Disclosure Accept 106 to join campaign. Server 10 issues a Descriptive Coded Instruction 2 that is unique to campaign and/or User 100 and documents User 100 actions within the system in the Audit Trail 34, Tracking Engine 33 and/or Reporting Engine 37.

In another embodiment, (FIG. 6) Financial, User Administrator 101, issues a Social Media Update 9 including a Descriptive Coded Instruction 2 comprising of a Disclosure/Instruction Type 27 and a Ticker Symbol 17 within the specified coded framework. The Server 10 monitors for the Social Media Update 9 from User Administrator 101 that includes Descriptive Coded Instruction 2 and a) provides a redirect hyperlink using a Redirect Engine 32, Analytics Engine 30 (for measurement and tracking) and Reporting Engine 37 to deliver a Designated Page URL 26 and b) the Syndication Engine 36, may issue alerts or further syndication using RSS Feed 50, Alerts Engine 51, SMS Engine 52, or Email Engine 53.

In another embodiment, (FIG. 7) Network to Device, a given device or network interface such as Mobile 11, Social Network 20, CPU 12, Tablet 13 or Wireless Device 14, may send a Descriptive Coded Instruction 2 to the Server 10 which then machine reads, verifies and interprets the instruction and relays an instruction to the Content Delivery Engine 70 that, in turn, pushes designated Content 71 to a designated user or device such as Mobile 11, Social Network 20, CPU 12, Tablet 13 or Wireless Device 14.

In another embodiment, (FIG. 8) Network to Cloud to Device, a given device or network interface such as Mobile 11, Social Network 20, CPU 12, Tablet 13 or Wireless Device 14, may send a Descriptive Coded Instruction 2 to the Server 10 which then machine reads, verifies and interprets the instruction and relays an instruction to the Content Delivery Engine 70 that, in turn, relays a request to a resource in the Cloud 21 which pushes designated Content 71 to a designated user or device such as Mobile 11, Social Network 20, CPU 12, Tablet 13 or Wireless Device 14.

In another embodiment, (FIG. 9) Network to Cloud, a given device or network interface such as Mobile 11, Social Network 20, CPU 12, Tablet 13 or Wireless Device 14, may send a Descriptive Coded Instruction 2 to the Server 10 which then machine reads, verifies and interprets the instruction and relays an instruction to the Content Delivery Engine 70 that, in turn, relays a request or instruction to a resource in the Cloud 21.

In another embodiment, (FIG. 10) Image Load Tracking, a Unique ID 8 is created for an image (Visual Display Badge 3) that is to appear on a client website. This unique ID is associated with the a. selected image and b. domain of the client. This associated information is stored in a database on the Server 10. Users of a client's website request the image by viewing a page on the client's site which initiates a request to a URL containing the unique ID of the client that is a pointing to an image extension. The URL is a then received by the Server 10, and is parsed by the Parsing Engine 29 to read for the client ID and client website referral. This information is then matched against the collected client information in the database on the Server 10 to serve a designated display image.

In another embodiment, (FIG. 11) Image Obfuscation, a Unique ID 8 is created for an image (Visual Display Badge 3) that is to appear on a client website. This unique ID is associated with the a. selected image and b. domain of the client. This associated information is stored in a database on the Server 10. Users of a client's website request the image by viewing a page on the client's site which initiates a request to a URL containing the unique ID of the client that is a pointing to an image extension. The URL is a then received by the Server 10, and is parsed by the Parsing Engine 29 to read for the client ID and client website referral. This information is then matched against the collected client information in the database on the Server 10. If correct, the server will then write the client's user the Appropriate Image 56. If incorrect, the server will then write the client's user a Warning Image 57. All images are written via server path to an original image that is outside the root public folder. This stops direct linking to files as the true path to the image is never displayed and is therefore unlinkable via the web.

In another embodiment, (FIG. 12) Verified ID, a User 100, initiates a Web Site Request 114, which, in turn, requests a script including an Image ID 110. This Image ID includes a URL with an embedded User ID 111 and an image file extension request or a Substitute Pixel 24. This request is received by Server 10, and processed by the Parsing Engine 29, which determines the Disclosure/Instruction Type 27, and checks the Verification Engine 31, which includes confirmation of User ID 111 and Campaign ID 112. Verification is sent to the Image Server 113 and then an image is served based upon the status of verification. If the user is not verified, a warning image 116 is served. If the user is verified, a Verified Image 115 is served to verify the identity of the campaign or admin user, and a Hyperlink 22 to further verification is provided.

In another embodiment, (FIG. 13) Payment for Content, a user device or platform (Mobile 11, Social Network 20, CPU 12, Tablet 13, Wireless Device 14) initiates a Short Instruction 6 which follows a coded standardized framework. The Short Instruction is received by Server 10, where the user is verified, the instruction is machine read and the message in interpreted. Server then sends an instruction to the Payment Engine 126 which returns a Payment Confirmation 121, and initiates a request for Content 71 to be delivered to a user device or platform (Mobile 11, Social Network 20, CPU 12, Tablet 13, Wireless Device 14).

In another embodiment, (FIG. 14) One Click Link, a Descriptive Coded Instruction 2 or URL is used to reach Server 10 and the request is parsed by the Parsing Engine 29. The Parsing Engine interprets the Disclosure/Instruction Type 27 and checks for a Disclosure Validation 128 confirming that the Referred Designated URL 26 page has a valid disclosure. Referral is documented in the Documentation Engine 58 and in the Analytics Engine 30 for measurement and reporting.

In another embodiment, (FIG. 15) Safety Warning, a User 100, initiates a Web Site Request 114, which, in turn, requests a script including an Image ID 110. This Image ID includes a URL with an embedded User ID 111 and an image file extension request or a Substitute Pixel 24. This request is received by Server 10, and processed by the Parsing Engine 29, which determines the Disclosure/Instruction Type 27, and checks the Verification Engine 31, which includes confirmation of User ID 111 and Campaign ID 112. Verification is sent to the Image Server 113 and then an image is served which includes the relevant safety warnings and hyperlinks that are stored in the database for that campaign and a Hyperlink 22 to additional information is provided. Loading of safety image and confirmed location is reported back to the Documentation Engine 58.

In another embodiment, (FIG. 16) Appending, a Social Media Update 9, is sent on a designated account. The Monitoring Engine 38 monitors designated accounts for updates and notifies Server 10 when a message is sent from a designated account that is either 1) originated from that account, 2) originates from that account with a specific identifier or 3) mentions a code, keyword or symbol that is recognized by the Server. As a result, the database issues a designated Descriptive Coded Instruction 2 or URL which is then appended to the body or annotations of the Social Media Update 122.

In another embodiment, (FIG. 17) Policy Documentation, a Policy 63 or long form document is interpreted through a Policy Encoder 127 either manually or electronically. The Policy Encoder provides a method to represent the contents of long form documents in a short form representation. Each specific statement or quality in the document is represented as a character or symbol in the coded framework and is represented as a specific grouping of symbols. Each representation is made in a specific placement within the Descriptive Coded Instruction 2 based upon a standard which is represented as characters 1-7 in FIG. 17 141-147.

In another embodiment, (FIG. 18) Policy Comparison, a Descriptive Coded Instruction 2 is received by Server 10 and the Parsing Engine 29 parses the instruction of characters with a specific placement within the Descriptive Coded Instruction 2 based upon a standard which is represented as characters 1-7 in FIG. 17 141-147. These characters are then compared to Preferences represented as Pref 1-7 in FIG. 17 161-167. The Comparison Engine 150, compares the Characters 141-147 to the Preferences 161-167 and generates a Descriptive Comparison 151.

In another embodiment, (FIG. 19) Policy Representation, a Descriptive Coded Instruction 2 is received by Server 10 and the Parsing Engine 29 parses the instruction of characters with a specific placement within the Descriptive Coded Instruction 2 based upon a standard which is represented as characters 1-7 in FIG. 17 141-147. These characters are then represented as Visual Representations 1-7 in FIG. 17 171-177 and generates a Descriptive Visual Representation 125 which can be formatted for viewing on the internet in a browser, on mobile or in a coded or other readable format.

In another embodiment, (FIG. 20) Content AV, a given device or network interface such as Mobile 11, Social Network 20, CPU 12, Tablet 13 or Wireless Device 14, may send a Descriptive Coded Instruction 2 to the Server 10 which then machine reads, verifies and interprets the instruction and relays an instruction to the Content Delivery Engine 70 that, in turn, relays a request or instruction to a resource in the Cloud 21. The Cloud then routes the request to a given user account, set top box or device represented in FIG. 20 as AV Device 123.

In another embodiment, (FIG. 21) Annotations, a Social Media Update 9, is sent on a designated account. The Annotations Engine 126 monitors designated accounts for updates and notifies Server 10 when a message is sent from a designated account that is either 1) originated from that account, 2) originates from that account with a specific identifier or 3) mentions a code, keyword or symbol that is recognized by the Server. As a result, the database issues a designated Descriptive Coded Instruction 2 or URL which is then appended to the body or annotations of the Social Media Update 122. Metadata for the coded instruction may be filed in annotations, as opposed to existing entirely in the body of the message.

In another embodiment, (FIG. 22) One Click Link, a Descriptive Coded Instruction 2 or URL is used to reach Server 10 and the request is parsed by the Parsing Engine 29. The Parsing Engine interprets the Disclosure/Instruction Type 27 and checks for a Display Interstitial Disclosure 139 which is displayed before the referral is passed through to the Designated URL 26. Referral is documented in the Documentation Engine 58 for measurement and reporting.

In another embodiment, (FIG. 23) Payment, a user device or platform (Mobile 11, Social Network 20, CPU 12, Tablet 13, Wireless Device 14) initiates a Short Instruction 6 which follows a coded standardized framework. The Short Instruction is received by Server 10, where the user is verified, the instruction is machine read and the message in interpreted. Server then sends an instruction to the Payment Engine 126 which returns a Payment Confirmation 121, and initiates a request to Cloud 21 to deliver the instruction to a user device or platform (Mobile 11, Social Network 20, CPU 12, Tablet 13, Wireless Device 14).

Reference should be had to the claims which define the scope of the invention.

The invention claimed is:

1. An automated computer detection and monitoring system for monitoring an electronic communication of a monitored target and transform the electronic communication to comply with a disclosure policy, the system comprising a controller in communication with a computing device, the controller having a memory including programming instructions that when executed by a processor are configured to cause the controller to:
   form a structured URL for the electronic communication by:
   concatenation of a base URL and a disclosure type code, said disclosure type code being selected from a data base of disclosure type codes associated with the content of the electronic communication; and
   creating a link between said structured URL and content associated with the electronic communication;
   wherein the controller is further configured to render the structured URL on a display of a device; and
   wherein accessing the structured URL renders the content on the display.

2. The system of claim 1, wherein the electronic communication is communicated over an Internet based communication platform.

3. The system of claim 2, wherein the Internet based communication platform is a website.

4. The system of claim 1, wherein the electronic communication is one or more of a text or a data file.

5. The system of claim 1, wherein the structured URL is a short form resource identifier and selection of the short form resource identifier is a re-direction to the content.

6. The system of claim 1, wherein the controller is configured to automatically add the structured URL with the disclosure type code to the electronic communication.

7. The system according to claim 1, wherein the programming instructions further comprise non-transient computer readable code means stored in a computer program product.

8. The system according to claim 1, wherein the controller is further configured to:
   detect the electronic communication of the monitored target;
   parse the electronic communication to identify the content associated with the electronic communication, the content including at least one or more of data underlying the electronic communication, a transaction associated with the electronic communication, and an analysis associated with the electronic communication.

9. The system according to claim 1, wherein the controller is further configured to:
   detect a new electronic communication by the monitored target;
   record and analyze the new electronic communication to identify new content associated with the new electronic communication, the new content including at least one or more of data underlying the new electronic communication, a transaction associated with the new electronic communication and an analysis associated with the new electronic communication, or an electronic communication associated with the record
   verify that the new content has not been previously recorded in a structured URL, and if not:
   form a new structured URL for the new posting by a concatenation of a new base URL and a new disclosure type code, the new disclosure type code being selected from the data base of disclosure type codes;
   create a link between the new structured URL and the new content; and
   render the new structured URL on a display of the device, wherein accessing the new structured URL causes the content to be rendered on the display.

10. The system according to claim 1 wherein the electronic communication is communicated within a database.

11. The system according to claim 1, wherein encoding or transcoding of data takes place via an Application Program Interface (API).

12. The system according to claim 1, wherein the controller is further configured to transmit the electronic communication including the structured URL to a target recipient system and wherein the target recipient system is configured to interpret the structured URL to identify a command or function linked with the structured URL, and execute the command or function.

13. The system according to claim 12, wherein the structured URL comprises a short instruction and the short instruction is one or more of an automated task, a command, or coded instruction.

14. The system of claim 13, wherein the short instruction is one or more of an automated task, a command, or coded instruction that can be read and interpreted by an algorithm.

15. The system of claim 13, wherein the short instruction is one or more of an automated task, a command, or coded instruction that can be read and interpreted by an algorithm used in one or more of Artificial Intelligence and Machine Learning.

16. The system of claim 15, wherein the structured URL is a short form resource identifier and selection of the short form resource identifier is a re-direction to the function associated with the structured URL.

17. The system of claim 16, wherein the structured URL is an encrypted short form resource identifier and selection of the short form resource identifier requires an encryption key for re-direction to the function associated with the structured URL.

18. The system of claim 13, wherein the structured URL is an encrypted short form structured statement and selection of the structured URL requires an encryption key for decryption of the encrypted standardized statement and/or re-direction to the function associated with the structured URL.

19. The system of claim 13, wherein the structured URL is a command, and selection of the short form resource identifier sends an instruction to a processing engine for executing the command.

20. A method of encoding an electronic data posting of a monitored target on an electronic communications network comprising:
   monitoring an electronic communication attributed to the monitored target;
   transcoding key data and data attributes of the electronic communication into a standardized and structured format by:
      forming a structured URL address code comprising a concatenation of a base URL and a type code, the type code being selected from a data base of type codes;
      creating a link between the structured URL and information that is recorded within a structured statement associated with the electronic communication; and
      rendering the structured URL on a display of a device, wherein accessing the structured URL renders the structured statement on the display.

21. The method of claim 20, wherein a serial number or identifying number is encoded or transcoded in conjunction within the structured statement.

* * * * *